United States Patent
Luo et al.

(10) Patent No.: US 12,238,035 B2
(45) Date of Patent: *Feb. 25, 2025

(54) METHOD AND APPARATUS FOR MONITORING PHYSICAL DOWNLINK CONTROL CHANNEL, AND DEVICE

(71) Applicant: DATANG MOBILE COMMUNICATIONS EQUIPMENT CO., LTD., Beijing (CN)

(72) Inventors: Chen Luo, Beijing (CN); Jiaqing Wang, Beijing (CN); Fangchen Cheng, Beijing (CN); Meiying Yang, Beijing (CN); Zheng Zhao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 505 days.

This patent is subject to a terminal disclaimer.

(21) Appl. No.: 17/607,835

(22) PCT Filed: Apr. 3, 2020

(86) PCT No.: PCT/CN2020/083167
§ 371 (c)(1),
(2) Date: Oct. 29, 2021

(87) PCT Pub. No.: WO2020/220929
PCT Pub. Date: Nov. 5, 2020

(65) Prior Publication Data
US 2022/0224486 A1    Jul. 14, 2022

(30) Foreign Application Priority Data
Apr. 30, 2019    (CN) .......................... 201910365516.9

(51) Int. Cl.
*H04W 48/12* (2009.01)
*H04L 5/00* (2006.01)
*H04W 52/02* (2009.01)

(52) U.S. Cl.
CPC ....... *H04L 5/0053* (2013.01); *H04W 52/0229* (2013.01)

(58) Field of Classification Search
CPC .......................... H04W 52/0229; H04L 5/0053
See application file for complete search history.

(56) References Cited

U.S. PATENT DOCUMENTS

2015/0201456 A1    7/2015   Lee et al.
2019/0313383 A1*  10/2019  Xiong .................. H04W 16/14
(Continued)

FOREIGN PATENT DOCUMENTS

| CN | 106604376 A | 4/2017 |
| CN | 108093495 A | 5/2018 |
| CN | 109429258 A | 3/2019 |
| CN | 111757431 A | 10/2020 |

(Continued)

OTHER PUBLICATIONS

Third Office Action for Chinese Patent Application 201910365516.9 issued on Nov. 3, 2022, and its English Translation provided by global dossier.
(Continued)

*Primary Examiner* — Dai Phuong
(74) *Attorney, Agent, or Firm* — Ladas & Parry, LLP

(57) ABSTRACT

A method and an apparatus for PDCCH monitoring, and a device are provided. The method includes: receiving power-saving signaling carrying PDCCH monitoring indication information and/or monitoring indication information for the cells from a network device, the PDCCH monitoring indication information being used to indicate whether to change first PDCCH monitoring, the first PDCCH monitoring being periodic PDCCH monitoring within a search space
(Continued)

configured for a UE, and the monitoring indication information for the cells being used to indicate a cell where the PDCCH monitoring needs to be performed; and monitoring the PDCCH in accordance with the PDCCH monitoring indication information and/or the monitoring indication information for the cells in the power-saving signaling.

14 Claims, 3 Drawing Sheets

(56) References Cited

U.S. PATENT DOCUMENTS

2021/0250922 A1* 8/2021 Xu .................. H04L 5/0082
2021/0314997 A1* 10/2021 Seo ................. H04L 5/0094

FOREIGN PATENT DOCUMENTS

| CN | 111757498 A | 10/2020 |
|---|---|---|
| EP | 3720197 A1 | 10/2020 |
| WO | 2014/035074 A1 | 3/2014 |

OTHER PUBLICATIONS

"Open Issues on CA" 3GPP TSG RAN WG1 Meeting #91 R1-1720694, Reno, NV, USA, Nov. 27-Dec. 1, 2017, Agenda Item: 7.3.4.2, Source: Qualcomm Incorporated.

International Search Report for PCT Application PCT/CN2020/083167, issued Jul. 1, 2020 and its English Translation.
Written Opinion for PCT Application PCT/CN2020/083167, issued Jul. 1, 2020 and its English Translation.
First Office Action and search report for Chinese Patent Application 201910365516.9, issued Mar. 22, 2021 and its English Translation.
"Summary of UE Power Saving Schemes" 3GPP TSG RAN WG1 #96, R1-1903622, Athens, Greece, Feb. 25-Mar. 1, 2019, Source: CATT Agenda Item: 7.2.9.2.
"Presentation of Specification/Report to TSG: TR 38.840v1.0.0" RP-190574 TR38.840v1.0.0, 3GPP TSG-RAN Meeting #83 RP-190574 Shenzhen, China, Mar. 18-21, 2019 Source: CATT, Agenda item: 9.3.5.
Extended European Search Report for European Patent Application 20799510.1, issued on May 11, 2022.
"PDCCH-based power saving signal/channel design," 3GPP TSG RAN WG1 #96bis, R1-1904103, Xi'an, China, Apr. 8-12, 2019, Source: vivo, Agenda Item: 7.2.9.1, all pages.
"PDCCH based power saving signal/channel design," 3GPP TSG RAN WG1 #96bis, R1-1905368, Xi'an, China, Apr. 8-12, 2019, Source:CATT, Agenda Item: 7.2.9.1, all pages.
"Reduction of PDCCH monitoring for UE power saving," 3GPP TSG RAN WG1 Meeting #96bis, R1-1905453, Xi'an, China, Apr. 8-12, 2019, Source: Huawei, HiSilicon, Agenda Item: 7.2.9.3, all pages.

* cited by examiner

METHOD AND APPARATUS FOR MONITORING PHYSICAL DOWNLINK CONTROL CHANNEL, AND DEVICE

CROSS-REFERENCE TO RELATED APPLICATIONS

This application is the U.S. national phase of PCT Application No. PCT/CN2020/083167 filed on Apr. 3, 2020, which claims a priority of the Chinese patent application No. 201910365516.9 filed in China on Apr. 30, 2019, which are incorporated herein by reference in their entireties.

TECHNICAL FIELD

The present disclosure relates to the field of communications technology, in particular to a method and an apparatus for monitoring a Physical Downlink Control Channel (PDCCH), and a device.

BACKGROUND

In a New Radio (NR, also called as $5^{th}$-Generation (5G)) system, in order to obtain downlink data, a User Equipment (UE) needs to monitor a PDCCH to determine whether there is downlink scheduling information. During the monitoring of the PDCCH, the UE decodes the PDCCH, and determines whether there is Downlink Control Information (DCI) carrying scheduling information about the UE through Cyclic Redundancy Check (CRC).

To facilitate the understanding of the scheme in the embodiments of the present disclosure, brief description about relevant concepts probably involved in the embodiments of the present disclosure will be given in the following.

1) PDCCH Monitoring

A base station allocates one or more search spaces for the UE through a downlink control signaling, and configuration of each search space is periodic. The UE detects the PDCCH within the allocated search spaces. A time point when the UE detects the PDCCH each time is called as a PDCCH monitoring occasion. In addition, usually the search spaces are configured periodically.

2) Carrier Aggregation (CA) Transmission

During the CA transmission, a cell where an initial connection is established by the UE is called as a Primary cell (Pcell). On the basis of the Pcell, a cell where an additional resource is provided for the data transmission is called as a Secondary cell (Scell).

3) Storage of Multi-Cell List

During Radio Resource Control (RRC) configuration, usually an Scell list is configured for the UE through CellGroupConfig→sCell ToAddModList, and maintained by the UE. When adding/modifying/deleting an Scell, an ScellIndex is used to indicate the cell. The SCellIndex is a short identifier of the Scell, and specific Scell information is configured through a specific Information Element (IE) in ServingCellConfigCommon.

4) Multi-Cell PDCCH Monitoring Process

As specified in the $3^{rd}$-Generation Partnership Project (3GPP) TR38.321, when the Scell is activated, the UE needs to monitor the Scell, and restarts an SCellDeactivationTimer. When the SCellDeactivationTimer has not expired or a deactivation command has not been received from a Media Access Control (MAC) Control Element (CE), the Scell is in an activated state. At this time, the UE needs to continue to monitor the PDCCH of the Scell.

5) Multi-Cell Scheduling Process

During the downlink scheduling, the base station (e.g., a gNB) transmits DCI format 1_1 for downlink scheduling to the UE, so as to indicate resource allocation conditions on different Scells to the UE.

In the case that a plurality of Scells is activated in downlink transmission, the data is transmitted more flexibly due to the scheduling through the plurality of Scells. However, when the Scell deactivation timer does not expire or before the deactivation command has been received, the UE needs to monitor the PDCCH of the activated Scell all the time. This monitoring behavior depends on whether the Scell is activated, so the monitoring flexibility is insufficient.

SUMMARY

An object of the present disclosure is to provide a method, a base station, and a terminal device for PDCCH monitoring to improve flexibility of the PDCCH monitoring and save the UE power consumption.

In one aspect, the present disclosure provides in some embodiments a method for PDCCH monitoring, including transmitting power-saving signaling carrying PDCCH monitoring indication information and/or monitoring indication information for the cells to a UE. The PDCCH monitoring indication information is used to indicate whether to change first PDCCH monitoring, the first PDCCH monitoring is periodic PDCCH monitoring within a search space configured for the UE, and the monitoring indication information for the cells is used to indicate a cell where the PDCCH monitoring needs to be performed.

In a possible embodiment of the present disclosure, the PDCCH monitoring indication information includes at least one of first indication information indicating whether to skip the first PDCCH monitoring, second indication information indicating whether to skip the first PDCCH monitoring and indicating a next PDCCH monitoring occasion when the first PDCCH monitoring has been skipped, third indication information indicating whether to change a PDCCH monitoring periodicity and indicating to perform the PDCCH monitoring according to the changed PDCCH monitoring periodicity, and fourth indication information indicating whether to change the PDCCH monitoring periodicity and indicating the changed PDCCH monitoring periodicity or an index corresponding to the changed PDCCH monitoring periodicity.

In a possible embodiment of the present disclosure, when the PDCCH monitoring indication information is the first indication information, the method further includes configuring a next PDCCH monitoring occasion for the UE through high layer signaling when the first PDCCH monitoring has been skipped.

In a possible embodiment of the present disclosure, when the PDCCH monitoring indication information is the third indication information, the method further includes configuring the changed PDCCH monitoring periodicity for the UE through high layer signaling.

In a possible embodiment of the present disclosure, when the PDCCH monitoring indication information is the fourth indication information, the method further includes configuring a correspondence between different values of the fourth indication information and the changed PDCCH monitoring periodicities for the UE through high layer signaling.

In a possible embodiment of the present disclosure, the monitoring indication information for the cells includes at least one of fifth indication information indicating a first quantity of Scells where the monitoring is to be performed, and sixth indication information indicating information about the Scells where the monitoring is to be performed.

In a possible embodiment of the present disclosure, when the monitoring indication information for the cells is the fifth indication information, the method further includes: configuring an Scell list of the first quantity of Scells for the UE through high layer signaling; or configuring a correspondence between different quantities of Scells and Scell lists for the UE through high layer signaling; or selecting the first quantity of Scells from a plurality of Scells in accordance with a predetermined ranking algorithm.

In a possible embodiment of the present disclosure, when the PDCCH monitoring indication information and/or the monitoring indication information for the cells in the power-saving signaling indicate that the first PDCCH monitoring is to be changed, the method further includes determining a first target PDCCH monitoring occasion in accordance with the PDCCH monitoring indication information and/or the monitoring indication information for the cells carried in the power-saving signaling and/or high layer signaling, and transmitting downlink signaling and/or the power-saving signaling to the UE at the first target PDCCH monitoring occasion. The downlink signaling carries the PDCCH monitoring indication information and/or the monitoring indication information for the cells.

In a possible embodiment of the present disclosure, prior to transmitting the power-saving signaling, the method further includes transmitting first downlink signaling carrying the PDCCH monitoring indication information and/or the monitoring indication information for the cells to the UE.

In a possible embodiment of the present disclosure, when data scheduled by the first downlink signaling is a last data packet for the UE, the PDCCH monitoring indication information and/or the monitoring indication information for the cells in the first downlink signaling are used to indicate that the first PDCCH monitoring is to be changed, and when the data scheduled by the first downlink signaling is not the last data packet for the UE, the PDCCH monitoring indication information and/or the monitoring indication information for the cells in the first downlink signaling are used to indicate that the first PDCCH monitoring is not to be changed.

In a possible embodiment of the present disclosure, after the first downlink signaling indicates the UE to change the first PDCCH monitoring, the method further includes: when new data has arrived at the UE, determining that the UE does not need to continue to change the first PDCCH monitoring; and when no new data has arrived at the UE yet, determining that the UE needs to continue to change the first PDCCH monitoring.

In another aspect, the present disclosure provides in some embodiments a method for PDCCH monitoring, including: receiving power-saving signaling carrying PDCCH monitoring indication information and/or monitoring indication information for the cells from a network device, the PDCCH monitoring indication information being used to indicate whether to change first PDCCH monitoring, the first PDCCH monitoring being periodic PDCCH monitoring within a search space configured for a UE, and the monitoring indication information for the cells being used to indicate a cell where the PDCCH monitoring needs to be performed; and monitoring the PDCCH in accordance with the PDCCH monitoring indication information and/or the monitoring indication information for the cells in the power-saving signaling.

In a possible embodiment of the present disclosure, the PDCCH monitoring indication information includes at least one of first indication information indicating whether to skip the first PDCCH monitoring, second indication information indicating whether to skip the first PDCCH monitoring and indicating a next PDCCH monitoring occasion when the first PDCCH monitoring has been skipped, third indication information indicating whether to change a PDCCH monitoring periodicity and indicating to perform the PDCCH monitoring according to the changed PDCCH monitoring periodicity, and fourth indication information indicating whether to change the PDCCH monitoring periodicity and indicating the changed PDCCH monitoring periodicity or an index corresponding to the changed PDCCH monitoring periodicity.

In a possible embodiment of the present disclosure, when the PDCCH monitoring indication information is the first indication information, the method further includes: receiving a next PDCCH monitoring occasion that is configured by the network device for the UE through high layer signaling and occurs when the first PDCCH monitoring has been skipped; and when the first indication information indicates that the first PDCCH monitoring is to be skipped, determining, in accordance with a configuration of the high layer signaling, the next PDCCH monitoring occasion that occurs when the first PDCCH monitoring has been skipped.

In a possible embodiment of the present disclosure, when the PDCCH monitoring indication information is the third indication information, the method further includes: receiving the changed PDCCH monitoring periodicity configured by the network device for the UE through high layer signaling; and determining, in accordance with the changed PDCCH monitoring periodicity configured through the high layer signaling, the next PDCCH monitoring occasion that occurs when the first PDCCH monitoring has been changed.

In a possible embodiment of the present disclosure, when the PDCCH monitoring indication information is the fourth indication information, the method further includes: receiving a correspondence between different values of the fourth indication information and the changed PDCCH monitoring periodicities configured by the network device for the UE through high layer signaling; and when the fourth indication information indicates that the PDCCH monitoring periodicity is to be changed, determining the changed PDCCH monitoring periodicity corresponding to the fourth indication information or an index corresponding to the changed PDCCH monitoring periodicity in accordance with the correspondence configured through the high layer signaling, and determining the next PDCCH monitoring occasion when the first PDCCH monitoring has been changed.

In a possible embodiment of the present disclosure, the monitoring indication information for the cells includes at least one of fifth indication information indicating a first quantity of Scells where the monitoring is to be performed, and sixth indication information indicating information about the Scells where the monitoring is to be performed.

In a possible embodiment of the present disclosure, when the monitoring indication information for the cells is the fifth indication information, the Scell indicated by the fifth indication information is determined in accordance with any one of: that the Scell indicated by the fifth indication information is determined in accordance with an Scell list of the first quantity of Scells configured through high layer signaling, or that the Scell list of the first quantity of Scells is determined in accordance with a correspondence between different quantities of Scells and Scell lists configured through high layer signaling, or that the first quantity of Scells are selected from a plurality of Scells in accordance with a predetermined ranking algorithm.

In a possible embodiment of the present disclosure, the monitoring the PDCCH in accordance with the PDCCH monitoring indication information and/or the monitoring indication information for the cells in the power-saving signaling includes: when the PDCCH monitoring indication information and/or the monitoring indication information for the cells in the power-saving signaling indicates that the first PDCCH monitoring is to be changed, determining a first target PDCCH monitoring occasion in accordance with the PDCCH monitoring indication information and/or the monitoring indication information for the cells carried in the power-saving signaling and/or high layer signaling; and monitoring downlink signaling and/or the power-saving signaling from the network device at the first target PDCCH occasion. The downlink signaling carries the PDCCH monitoring indication information and/or the monitoring indication information for the cells.

In a possible embodiment of the present disclosure, the method further includes changing or restoring the first PDCCH monitoring in accordance with the PDCCH monitoring indication information and/or the monitoring indication information for the cells in the power-saving signaling and/or the downlink signaling monitored at the first target PDCCH monitoring occasion.

In a possible embodiment of the present disclosure, after the downlink signaling and/or power-saving signaling from the network device have been monitored at the first target PDCCH monitoring occasion, the method further includes: determining whether to change the first PDCCH monitoring in accordance with the PDCCH monitoring indication information and/or the monitoring indication information for the cells in the power-saving signaling and/or the downlink signaling monitored at the first target PDCCH monitoring occasion; when the first PDCCH monitoring is determined to be changed, determining a next target PDCCH monitoring occasion in accordance with high layer signaling and the PDCCH monitoring indication information and/or the monitoring indication information for the cells monitored at the first target PDCCH monitoring occasion, and continuing to monitor the downlink signaling and/or the power-saving signaling from the network device at the next target PDCCH monitoring occasion; and when the first PDCCH monitoring is not to be changed, restoring the first PDCCH monitoring.

In a possible embodiment of the present disclosure, the continuing to monitor the downlink signaling and/or power-saving signaling from the network device at the next target PDCCH monitoring occasion includes: when the Scell indicated by the monitoring indication information for the cells includes all-zero bits, with respect to a Pcell, monitoring the downlink signaling and/or the power-saving signaling from the network device at the next target PDCCH monitoring occasion; and when the Scell indicated by the monitoring indication information for the cells includes non-all-zero bits, with respect to the Pcell and the Scell indicated by the monitoring indication information for the cells, monitoring the downlink signaling and/or the power-saving signaling from the network device at the next target PDCCH monitoring occasion.

In a possible embodiment of the present disclosure, the restoring the first PDCCH monitoring includes: when the Scell indicated by the monitoring indication information for the cells includes all-zero bits, with respect to a Pcell, restoring the first PDCCH monitoring; and when the Scell indicated by the monitoring indication information for the cells includes non-all-zero bits, with respect to the Pcell and the Scell indicated by the monitoring indication information for the cells, restoring the first PDCCH monitoring.

In a possible embodiment of the present disclosure, prior to receiving the power-saving signaling, the method further includes: receiving first downlink signaling carrying the PDCCH monitoring indication information and/or the monitoring indication information for the cells from the network device; when the PDCCH monitoring indication information and/or the monitoring indication information for the cells in the first downlink signaling indicates that the first PDCCH monitoring is to be changed, determining a second target PDCCH monitoring occasion in accordance with the PDCCH monitoring indication information and/or the monitoring indication information for the cells carried in the first downlink signaling and/or high layer signaling; and receiving the power-saving signaling that carries the PDCCH monitoring indication information and/or the monitoring indication information for the cells from the network device at the second target PDCCH monitoring occasion.

In a possible embodiment of the present disclosure, when data scheduled by the first downlink signaling is a last data packet for the UE, the PDCCH monitoring indication information and/or the monitoring indication information for the cells in the first downlink signaling are used to indicate that the first PDCCH monitoring is to be changed, and when the data scheduled by the first downlink signaling is not the last data packet for the UE, the PDCCH monitoring indication information and/or the monitoring indication information for the cells in the first downlink signaling are used to indicate that the first PDCCH monitoring is not to be changed.

In yet another aspect, the present disclosure provides in some embodiments an apparatus for PDCCH monitoring, including: a reception unit configured to receive power-saving signaling carrying PDCCH monitoring indication information and/or monitoring indication information for the cells from a network device, the PDCCH monitoring indication information being used to indicate whether to change first PDCCH monitoring, the first PDCCH monitoring being periodic PDCCH monitoring within a search space configured for a UE, and the monitoring indication information for the cells being used to indicate a cell where the PDCCH monitoring needs to be performed; and a determination unit configured to monitor the PDCCH in accordance with the PDCCH monitoring indication information and/or the monitoring indication information for the cells in the power-saving signaling.

In still yet another aspect, the present disclosure provides in some embodiments a UE, including a memory, a processor, a transceiver, and a computer program stored in the memory and executed by the processor. The transceiver is configured to receive power-saving signaling carrying PDCCH monitoring indication information and/or monitoring indication information for the cells from a network device, the PDCCH monitoring indication information is used to indicate whether to change first PDCCH monitoring, the first PDCCH monitoring is periodic PDCCH monitoring within a search space configured for a UE, and the monitoring indication information for the cells is used to indicate a cell where the PDCCH monitoring needs to be performed. The processor is configured to execute the program so as to monitor the PDCCH in accordance with the PDCCH monitoring indication information and/or the monitoring indication information for the cells in the power-saving signaling.

In still yet another aspect, the present disclosure provides in some embodiments an apparatus for PDCCH monitoring, including a transmission unit configured to transmit power-saving signaling carrying PDCCH monitoring indication information and/or monitoring indication information for the cells to a UE. The PDCCH monitoring indication information is used to indicate whether to change first PDCCH monitoring, the first PDCCH monitoring is periodic PDCCH monitoring within a search space configured for the UE, and the monitoring indication information for the cells is used to indicate a cell where the PDCCH monitoring needs to be performed.

In still yet another aspect, the present disclosure provides in some embodiments a network device, including a memory, a processor, a transceiver, and a computer program stored in the memory and executed by the processor. The transceiver is configured to transmit power-saving signaling carrying PDCCH monitoring indication information and/or monitoring indication information for the cells to a UE. The PDCCH monitoring indication information is used to indicate whether to change first PDCCH monitoring, the first PDCCH monitoring is periodic PDCCH monitoring within a search space configured for the UE, and the monitoring indication information for the cells is used to indicate a cell where the PDCCH monitoring needs to be performed.

In still yet another aspect, the present disclosure provides in some embodiments a computer-readable storage medium including an instruction. The instruction is executed by a computer so as to implement the above-mentioned methods.

The present disclosure has the following beneficial effects.

According to the method and apparatus for monitoring the PDCCH as well as the device in the embodiments of the present disclosure, it is able to monitor the PDCCH flexibly with respect to the Pcell and/or at least one Scell. In addition, it is also able to monitor the PDCCH normally through skipping the Pcell and/or at least one Scell, thereby to reduce the power consumption for monitoring.

BRIEF DESCRIPTION OF THE DRAWINGS

Through reading the detailed description hereinafter, the other advantages and benefits will be apparent to a person skilled in the art. The drawings are merely used to show the preferred embodiments, but shall not be construed as limiting the present disclosure. In addition, in the drawings, same reference symbols represent same members. In these drawings.

DETAILED DESCRIPTION

Figure 1:
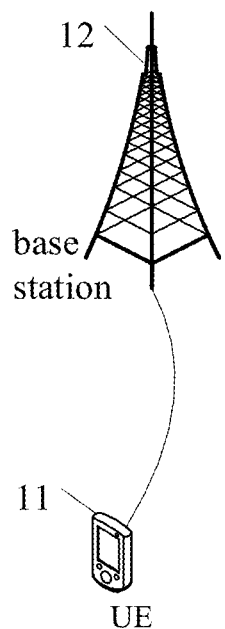
FIG. 1 is a schematic view showing an application scenario of a method for PDCCH monitoring according to some embodiments of the present disclosure.

Hereinafter, exemplary embodiments of the present disclosure will be described in more detail with reference to the accompanying drawings. Although the drawings show exemplary embodiments of the present disclosure, it should be understood that the present disclosure can be implemented in various forms and should not be limited by the embodiments set forth herein. On the contrary, these embodiments are provided to enable a more thorough understanding of the present disclosure and to fully convey the scope of the present disclosure to those skilled in the art.

Such words as "first" and "second" involved in the specification and the appended claims are merely used to differentiate different objects rather than to represent any specific order. It should be appreciated that, the data used in this way may be replaced with each other, so as to implement the embodiments in an order other than that shown in the drawings or described in the specification. In addition, such terms as "include" or "including" or any other variations involved in the present disclosure intend to provide non-exclusive coverage, so that a procedure, method, system, product or device including a series of steps or units may also include any other elements not listed herein, or may include any inherent steps or units of the procedure, method, system, product or device. The expression "and/or" in the specification and the appended claims is used to represent at least one of listed objects.

The technology described in the context shall not be limited to a Long Term Evolution (LTE)/LTE-Advanced (LTE-A) system, and it may also be applied to various wireless communication systems, e.g., Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), or any other system. The terms "system" and "network" may be replaced with each other. The CDMA system may be used to implement such radio technologies as CDMA2000 and Universal Terrestrial Radio Access (UTRA). The UTRA may include Wideband Code Division Multiple Access (WCDMA) and the other CDMA variants. The TDMA system may be used to implement such a radio technology as Global System for Mobile Communication (GSM). The OFDMA system may be used to implement such radio technologies as Ultra Mobile Broadband (UMB), Evolved-UTRA (E-UTRA), IEEE 802.11 (Wireless Fidelity (Wi-Fi)), IEEE 802.16 (WiMAX), IEEE 802.20, and Flash-OFDM. The UTRA and the E-UTRA are parts of a Universal Mobile Telecommunications System (UMTS). The LTE and a more advanced LTE (e.g., LTE-A) are new UMTS versions using the E-UTRA. The UTRA, E-UTRA, UMTS, LTE, LTE-A and GSM have been described in literatures from the $3^{rd}$-Generation Partnership Project (3GPP). CDMA2000 and UMB have been described in literatures from the "$3^{rd}$-Generation Partnership Project 2" (3GPP2). The technology described in the context may be applied to the above-mentioned systems and radio technologies, or applied to the other systems and radio technologies. However, a New Radio (NR) system has been described illustratively hereinafter, and terms for the NR system have been used in most of the description, although these technologies may also be applied to the systems other than the NR system.

The following description is given for illustrative purposes but shall not be construed as limiting the scope, applicability or configuration set forth in the appended claims. Any alterations may be made on functions and arrangements of the discussed elements without departing from the spirit and scope of the present disclosure. Various procedures or assemblies may be omitted, replaced or added appropriately in the examples. For example, steps of the described method may be performed in an order different from that described in the context, and some steps may be added, omitted or combined. In addition, the features described with reference to some examples may be combined in the other examples.

As mentioned hereinabove, in the related art, in the case that one or more Scells have been activated during the downlink transmission, before an Scell timer has expired or a deactivation command has been received, a UE needs to monitor a PDCCH for the activated Scell all the time, so flexibility of the PDCCH monitoring is insufficient. In addition, it leads to large power consumption, especially when there is no data transmission on the Scell.

An object of the present disclosure is to provide a method for PDCCH monitoring, so as to improve flexibility of the PDCCH monitoring and reduce the power consumption for the monitoring.

FIG. 1 is a block diagram of an applicable wireless communication system according to some embodiments of the present disclosure. The wireless communication system includes a terminal 11 and a network device (here, a base station 12 is taken as an example). The terminal 11 may also be called as a user terminal or a UE, and it may be a terminal side device such as a mobile phone, a tablet personal computer, a laptop computer, a Personal Digital Assistant (PDA), a Mobile Internet Device (MID), a wearable device or a vehicle-mounted device. It should be appreciated that, the specific type of the terminal 11 will not be particularly defined herein. The base station 12 may be any of various base stations and/or a network element of a core network. The base station may be a 5$^{th}$-Generation (5G) base station or a future base station (e.g., gNB, 5G NR NB), or a base station in the other communication system (e.g., eNB, Wireless Local Area Network (WLAN) access point, or any other access point). The base station 12 may be called as node B, evolved node B, access point, Base Transceiver Station (BTS), radio base station, radio transceiver, Basic Service Set (BSS), Extended Service Set (ESS), home node B, evolved home node B, WLAN access point, WiFi node or any other appropriate term in the field. The base station shall not be limited to a specific technical term, as long as a same technical effect is achieved. It should be appreciated that, merely the base station in the NR system is taken as an example in the embodiments of the present disclosure, but a specific type of the base station will not be particularly defined herein.

The base station 12 may communicate with the terminal 11 under the control of a base station controller. In various examples, the base station controller may be a part of a core network or some base stations. Some base stations may exchange control information or user data with the core network through backhaul. In some examples, some of the base stations may directly or indirectly communicate with each other through a backhaul link, and the backhaul link may be a wired or wireless communication link. The wireless communication system may support operations on a plurality of carriers (waveform signals at different frequencies). A multi-carrier transmitter may transmit modulated signals on the plurality of carriers simultaneously. For example, each communication link may be a multi-carrier signal modulated using various radio technologies. Each modulated signal may be transmitted on different carriers and may carry control information (e.g., reference signal or control channel), overhead information, data, etc.

The base station 12 may communicate with the terminal 11 in a wireless manner via one or more access points. Each base station may provide a communication coverage at a corresponding coverage region. A coverage region for an access point may be a sector merely constituting a part of the coverage region. The wireless communication system may include various base stations (e.g., macro base station, micro base station, or pico base station). The base station may also use different radio technologies, e.g., cellular or WLAN radio access technology. The base station may be associated with same or different access network or operator deployments. The coverage regions of different base stations (including the coverage regions of the base stations of a same type or different types, the coverage regions using same or different radio technologies, or the coverage regions belonging to same or different access networks) may overlap each other.

A communication link in the wireless communication system may include an uplink for carrying uplink (UL) transmission (e.g., from the terminal 11 to the base station 12), or a downlink for carrying downlink (DL) transmission (e.g., from the base station 12 to the terminal 11). The UL transmission may also be called as reverse link transmission, and the DL transmission may also be called as forward link transmission. The downlink transmission may be performed using a licensed frequency band, a non-licensed frequency band or both. Similarly, the uplink transmission may be performed using the licensed frequency band, the non-licensed frequency band or both.

Relevant signaling involved in the embodiments of the present disclosure will be described hereinafter so as to facilitate the understanding thereof.

Power-saving signaling: a network device may transmit the power-saving signaling that carries PDCCH monitoring indication information and/or monitoring indication information for the cells adopted in the embodiments of the present disclosure to a UE. Here, the power-saving signaling may be dedicated signaling. The dedicated signaling refers to signaling issued by the network device for achieving some functions individually.

Downlink signaling: it refers to, in general, signaling for indicating downlink transmission. In the context, apart from scheduling information for indicating the UE to transmit downlink data, the downlink signaling also carries the PDCCH monitoring indication information. The downlink signaling includes various pieces of signaling, such as DCI and MAC CE. The network device may transmit the PDCCH monitoring indication information through one or more of the pieces of downlink signaling. When the PDCCH monitoring indication information is transmitted through a plurality of pieces of downlink signaling, it is able to improve the reception reliability of the PDCCH monitoring indication information for the UE.

The network device may transmit the DCI carrying a PDCCH monitoring indicator to the UE. For example, the network device may carry the PDCCH monitoring indicator in the DCI in a format 1_0 or 1_1.

Alternatively, the network device may transmit the MAC CE carrying the PDCCH monitoring indicator to the UE.

For example, the network device may carry the one-bit or two-bit PDCCH monitoring indicator in the MAC CE. The one-bit PDCCH monitoring indicator will be taken as an example, and the PDCCH monitoring indicator is used to indicate whether the UE needs to change a PDCCH monitoring periodicity.

Figure 2:
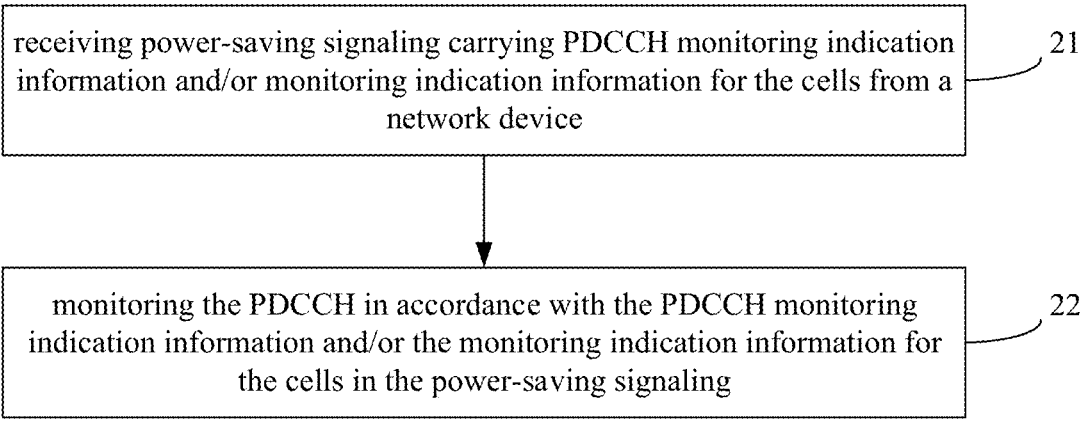
FIG. 2 is a flow chart of the method for monitoring the PDCCH according to some embodiments of the present disclosure.

As shown in FIG. 2, the present disclosure provides in some embodiments a method for PDCCH monitoring for a UE, which includes the following steps.

Step 21: receiving power-saving signaling carrying PDCCH monitoring indication information and/or monitoring indication information for the cells from a network device. The PDCCH monitoring indication information is used to indicate whether to change first PDCCH monitoring, the first PDCCH monitoring is periodic PDCCH monitoring within a search space configured for the UE, and the monitoring indication information for the cells is used to indicate a cell where the PDCCH monitoring needs to be performed.

Here, the network device may transmit the power-saving signaling through a Pcell of the UE. When the PDCCH monitoring indication information is used to indicate whether to change the first PDCCH monitoring, specifically it is used to indicate whether to change the first PDCCH monitoring on the Pcell and/or an activated Scell. It should be appreciated that, the first PDCCH monitoring here refers to periodic PDCCH monitoring within the search space configured for the UE, i.e., a normal PDCCH monitoring behavior in related art.

Step 22: monitoring the PDCCH in accordance with the PDCCH monitoring indication information and/or the monitoring indication information for the cells in the power-saving signaling.

Here, the changing the first PDCCH monitoring includes skipping the first PDCCH monitoring, changing a PDCCH monitoring periodicity of the first PDCCH monitoring, etc. For example, when the PDCCH monitoring indication information indicates that the first PDCCH monitoring is to be skipped, the UE may not perform the first PDCCH monitoring on a corresponding cell any more. In this way, even when a certain Scell is in an activated state, the normal PDCCH monitoring will not be performed on the cell through the above-mentioned scheme in the embodiments of the present disclosure, so it is able to provide a flexible PDCCH monitoring scheme. In addition, when the normal PDCCH monitoring is ceased, it is able to reduce the power consumption of the UE, and prolong a stand-by time of the UE.

The network device may determine whether it is necessary to control a certain UE to skip the first PDCCH monitoring on the Pcell and/or at least one Scell in accordance with various strategies. For example, when there is no data to be transmitted to the UE in a cache, the network device may transmit the power-saving signal, and control the UE to skip the first PDCCH monitoring on the Pcell and/or the Scell. For another example, during the scheduling of the data transmission for the UE, the network device may determine whether it is necessary to control the UE to skip the first PDCCH monitoring on the Pcell and/or the Scell in accordance with remaining data.

Through the above steps, it is able to monitor the PDCCH flexibly, and reduce the power consumption of the UE.

In a possible embodiment of the present disclosure, the PDCCH monitoring indication information includes at least one of first indication information indicating whether to skip the first PDCCH monitoring, second indication information indicating whether to skip the first PDCCH monitoring and indicating a next PDCCH monitoring occasion when the first PDCCH monitoring has been skipped, third indication information indicating whether to change a PDCCH monitoring periodicity and indicating to perform the PDCCH monitoring according to the changed PDCCH monitoring periodicity, and fourth indication information indicating whether to change the PDCCH monitoring periodicity and indicating the changed PDCCH monitoring periodicity or an index corresponding to the changed PDCCH monitoring periodicity.

When the PDCCH monitoring indication information is the first indication information, the UE may further receive a next PDCCH monitoring occasion that is configured by the network device for the UE through high layer signaling and occurs when the first PDCCH monitoring has been skipped. Hence, when the first indication information indicates that the first PDCCH monitoring is to be skipped, the UE may determine the next PDCCH monitoring occasion in accordance with the high layer signaling when the first PDCCH monitoring has been skipped.

For another example, when the PDCCH monitoring indication information is the third indication information, the UE may further receive the changed PDCCH monitoring periodicity configured by the network device for the UE through high layer signaling, and determine the next PDCCH monitoring occasion in accordance with the changed PDCCH monitoring periodicity configured through the high layer signaling when the first PDCCH monitoring has been changed.

For yet another example, when the PDCCH monitoring indication information is the fourth indication information, the UE may further receive a correspondence between different values of the fourth indication information and the changed PDCCH monitoring periodicities (or indices corresponding to the changed PDCCH monitoring periodicities) configured by the network device for the UE through high layer signaling, and when the fourth indication information indicates that the PDCCH monitoring periodicity is to be changed, determine the changed PDCCH monitoring periodicity (or the indices corresponding to the changed PDCCH monitoring periodicities) corresponding to the fourth indication information in accordance with the correspondence configured through the high layer signaling, and determine the next PDCCH monitoring occasion when the first PDCCH monitoring has been changed.

Several specific examples of the PDCCH monitoring indication information will be given as follows.

The PDCCH monitoring indication information may be indicated through one bit or two bits in the following forms.

First form corresponding to the first indication information: the PDCCH monitoring indication information is used to indicate the UE whether to skip the PDCCH monitoring.

Second form corresponding to the second indication information: the PDCCH monitoring indication information is used to indicate a next PDCCH monitoring occasion N, where N>1.

Third form corresponding to the third indication information: the PDCCH monitoring indication information is used to indicate whether to change the PDCCH monitoring periodicity.

Fourth form corresponding to the fourth indication information: the PDCCH monitoring indication information is used to indicate the changed PDCCH monitoring periodicity K or an index corresponding to the changed PDCCH monitoring periodicity, where K>1.

1) First Form of the PDCCH Monitoring Indication Information

Presumed that one-bit indication information is adopted, this indication information is used to indicate whether to skip the PDCCH monitoring. For example, when the indication information is "0", it is used to indicate the UE to perform a normal PDCCH monitoring mode (the above-mentioned first PDCCH monitoring), i.e., indicate the UE to monitor the PDCCH at a next PDCCH monitoring occasion within the search space. For example, when the indication information is "1", it is used to indicate the UE to skip the PDCCH monitoring, and a next PDCCH monitoring occasion may be preconfigured through high layer signaling.

2) Second Form of the PDCCH Monitoring Indication Information

Presumed that two-bit indication information is adopted, this indication information is used to indicate a next PDCCH monitoring occasion for the UE. For example, when the indication information is "00", it is used to indicate the UE to monitor the PDCCH at a next PDCCH monitoring occasion within the search space (i.e., perform the first PDCCH monitoring); when the indication information is "01", it is used to indicate the UE to monitor the PDCCH at an $(N_1)^{th}$ PDCCH monitoring occasion; when the indication information is "10", it is used to indicate the UE to monitor the PDCCH at an $(N_2)^{th}$ PDCCH monitoring occasion; and when the indication information is "11", it is used to indicate the UE to monitor the PDCCH at an $(N_3)^{th}$ PDCCH monitoring occasion.

When the PDCCH monitoring indication information is "00", it is used to indicate the UE to perform the normal PDCCH monitoring mode (i.e., the first PDCCH monitoring). When the PDCCH monitoring indication information is not "00", it is used to indicate the UE to skip the normal PDCCH monitoring mode, and monitor the PDCCH at the $(N_1)^{th}$ PDCCH monitoring occasion spaced apart from a current PDCCH corresponding to the first downlink signaling by $N_1$-1 PDCCH monitoring occasions, or it is used to indicate the UE to monitor the PDCCH at the $(N_2)^{th}$ PDCCH monitoring occasion spaced apart from the current PDCCH corresponding to the first downlink signaling by $N_2$-1 PDCCH monitoring occasions, or it is used to indicate the UE to monitor the PDCCH at the $(N_3)^{th}$ PDCCH monitoring occasion spaced apart from the current PDCCH corresponding to the first downlink signaling by $N_3$-1 PDCCH monitoring occasions.

3) Third Form of the PDCCH Monitoring Indication Information

Presumed that one-bit indication information is adopted, this indication information is used to indicate whether to change the PDCCH monitoring periodicity. For example, when the PDCCH monitoring indication information is "0", it is used to indicate that the PDCCH monitoring periodicity is not to be changed, i.e., the PDCCH is monitored in accordance with the monitoring periodicity K configured through high layer signaling (i.e., the first PDCCH monitoring is performed). For example, when K=1, the PDCCH is monitored at each PDCCH monitoring occasion. When the PDCCH monitoring indication information is "1", it is used to indicate the UE to change the PDCCH monitoring periodicity, and the changed PDCCH monitoring periodicity may be configured through high layer signaling (e.g., RRC signaling).

4) Fourth Form of the PDCCH Monitoring Indication Information

In the case of two-bit PDCCH monitoring indication information, it is used to indicate the changed PDCCH monitoring periodicity, or an index value of the changed PDCCH monitoring periodicity in a preconfigured PDCCH monitoring periodicity set. The PDCCH monitoring periodicity set may be preconfigured through high layer signaling. For example, the PDCCH monitoring periodicity set preconfigured through high layer signaling is {slot $K_1$, slot $K_2$, slot $K_3$, slot $K_4$}, where $K_1$ represents a PDCCH monitoring occasion within a $(K_1)^{th}$ slot spaced apart from a current slot where the current PDCCH corresponding to the first downlink signaling is located by $K_1$-1 slots. To be specific, there exist the following circumstances for the received PDCCH monitoring indication information. When the PDCCH monitoring indication information is "00", it is used to indicate that the PDCCH monitoring periodicity is a monitoring occasion within a $(K_1)^{th}$ slot; when the PDCCH monitoring indication information is "01", it is used to indicate that the PDCCH monitoring periodicity is a monitoring occasion within a $(K_2)^{th}$ slot; when the PDCCH monitoring indication information is "10", it is used to indicate that the PDCCH monitoring periodicity is a monitoring occasion within a $(K_3)^{th}$ slot; and when the PDCCH monitoring indication information is "11", it is used to indicate that the PDCCH monitoring periodicity is a monitoring occasion within a $(K_4)^{th}$ slot.

When there is the scheduling information about the UE in the DCI at a current time point and the UE is capable of obtaining the PDCCH monitoring indication information carried in the DCI through CRC, the UE may obtain a subsequent PDCCH monitoring behavior in accordance with the PDCCH monitoring indication information, e.g., indicate a next PDCCH monitoring occasion, or indicate a change condition of the PDCCH monitoring periodicity, or indicate a value of the changed PDCCH monitoring periodicity.

When there is no scheduling information about the UE in the DCI at the current time point and the UE is incapable of obtaining the PDCCH monitoring indication information carried in the DCI through CRC, the UE may receive the power-saving signaling, and read the PDCCH monitoring indication information carried in the power-saving signaling, so as to obtain the subsequent PDCCH monitoring behavior, e.g., indicate a next PDCCH monitoring occasion, or indicate a change condition of the PDCCH monitoring periodicity, or indicate a value of the changed PDCCH monitoring periodicity.

In a possible embodiment of the present disclosure, the monitoring indication information for the cells includes at least one of fifth indication information indicating a first quantity of Scells where the monitoring is to be performed, and sixth indication information indicating information about the Scells where the monitoring is to be performed.

In the embodiments of the present disclosure, when an Scell indicated by the fifth indication information or the sixth indication information includes all-zero bits, it means that the monitoring is merely performed on the Pcell, and when the Scell indicated by the fifth indication information or the sixth indication information includes non-all-zero bits, it means that the monitoring is performed on the Pcell and the Scell indicated by the fifth indication information or the sixth indication information.

For example, when the monitoring indication information for the cells is the fifth indication information, 1) the Scell indicated by the fifth indication information is determined in accordance with an Scell list of the first quantity of Scells configured through high layer signaling, or 2) the Scell list of the first quantity of Scells is determined in accordance with a correspondence between different quantities of Scells and Scell lists configured through high layer signaling, or 3) the first quantity of Scells are selected from a plurality of Scells in accordance with a predetermined ranking algorithm.

Several specific examples of the monitoring indication information for the cells will be given hereinafter.

First Form of the Monitoring Indication Information for the Cells (Corresponding to the Fifth Indication Information)

The monitoring indication information for the cells is N-bit information, and it is used to indicate the quantity M of Scells (Scell groups) to be monitored. For example, N=5, and M is a decimal number corresponding to the 5-bit binary information, so the information may at most indicate 31 Scells. In addition, the list of Scells or Scell groups is preconfigured on the basis of high layer signaling from the base station. When the monitoring indication information for the cells includes all-zero bits (i.e., values of the bits are all zero) or zero bit, it means that there is no Scell where the PDCCH needs to be monitored, and at this time the UE merely needs to monitor the PDCCH or power-saving signaling from the Pcell. When the monitoring indication information for the cells includes non-all-zero bits (i.e., the values of the bits are not all zero) or zero bit, a specific monitoring cell may be determined as follows.

First mode: the monitoring cell is semi-statically configured through high layer signaling.

The Scell or Scell group to be monitored is configured by the base station through high layer signaling from the Pcell.

Second mode: Scell lists consisting of different quantities of Scells or Scell groups are preconfigured through high layer signaling.

For example, with respect to the power-saving signaling, Scell lists corresponding to different quantity of Scells are preconfigured by the base station for the UE, as shown in Table 1.

TABLE 1

| The quantity of Scells of Scell groups | Scell List |
| --- | --- |
| 1 | {Scell(s)1} |
| 2 | {Scell(s)$2_1$, Scell(s)$2_2$} |
| 3 | {Scell(s)$3_1$, Scell(s)$3_2$, Scell(s)$3_3$} |
| ... | ... |
| $M = 2^N - 1$ | {Scell(s)$M_1$, Scell(s)$M_2$, ..., Scell(s)$M_M$} |

Here, Scell(s)i refers to an index of the Scell or Scell group configured through the high layer signaling. The indices in different lists may be the same or different.

Third mode: a plurality of Scells (or Scell groups) are ranked in accordance with a ranking algorithm pre-agreed by the base station and the UE, and first M Scells (or Scell groups) are selected from the plurality of Scells (or Scell groups).

Second Mode of the Monitoring Indication Information for the Cells (Corresponding to the Sixth Indication Information)

The monitoring indication information for the cells is M-bit information, where M represents the total quantity of Scells or Scell groups. The monitoring indication information for the cells is used to indicate specific Scells for the PDCCH monitoring indication information, and each bit corresponds to one Scell or Scell group. When the bit is "1", it means that a corresponding PDCCH monitoring behavior needs to be performed on the Scell or Scell group, and a specific monitoring behavior is determined through the PDCCH monitoring indication information. When the Scell list includes all 0s, it means that there is no Scell or Scell group where the PDCCH monitoring needs to be performed, and at this time, the UE merely needs to monitor the PDCCH and/or the power-saving signaling from the Pcell.

In addition, the PDCCH monitoring indication information in the power-saving signaling may be a common monitoring action with respect to the Pcell and the cells in the monitoring indication information for the cells, or an indicator with respect to an individual Scell or Scell group.

In a possible embodiment of the present disclosure, in Step 22, when the PDCCH monitoring indication information and/or the monitoring indication information for the cells in the power-saving signaling indicates that the first PDCCH monitoring is to be changed, the UE may determine a first target PDCCH monitoring occasion in accordance with the PDCCH monitoring indication information and/or the monitoring indication information for the cells carried in the power-saving signaling and/or high layer signaling, and then monitor downlink signaling and/or the power-saving signaling from the network device at the first target PDCCH occasion. The downlink signaling carries the PDCCH monitoring indication information and/or the monitoring indication information for the cells.

Further, the UE may change or restore the first PDCCH monitoring in accordance with the PDCCH monitoring indication information and/or the monitoring indication information for the cells in the power-saving signaling and/or the downlink signaling monitored at the first target PDCCH monitoring occasion.

Furthermore, after the downlink signaling and/or power-saving signaling from the network device have been monitored at the first target PDCCH monitoring occasion, the UE may determine whether to change the first PDCCH monitoring in accordance with the PDCCH monitoring indication information and/or the monitoring indication information for the cells in the power-saving signaling and/or the downlink signaling monitored at the first target PDCCH monitoring occasion.

1) When the first PDCCH monitoring is to be changed, the UE may determine a next target PDCCH monitoring occasion in accordance with high layer signaling and the PDCCH monitoring indication information and/or the monitoring indication information for the cells monitored at the first target PDCCH monitoring occasion, and continue to monitor the downlink signaling and/or the power-saving signaling from the network device at the next target PDCCH monitoring occasion, i.e., continue to monitor the downlink signaling and/or new power-saving signaling from the network device at the next target PDCCH monitoring occasion. In this way, through repeating the above procedure, it is able to change or restore the first PDCCH monitoring.

To be specific, when the Scell indicated by the monitoring indication information for the cells includes all-zero bits, with respect to the Pcell, the UE may monitor the downlink signaling and/or power-saving signaling from the network device at the next target PDCCH monitoring occasion. When the Scell indicated by the monitoring indication information for the cells includes non-all-zero bits, with respect to the Pcell and the Scell indicated by the monitoring indication information for the cells, the UE may monitor the downlink signaling from the network device at the next target PDCCH monitoring occasion.

2) When the first PDCCH monitoring is not to be changed, the UE may restore the first PDCCH monitoring.

Here, the restoring the first PDCCH monitoring may specifically include: 1) when the Scell indicated by the monitoring indication information for the cells includes all-zero bits, with respect to a Pcell, restoring the first PDCCH monitoring; and 2) when the Scell indicated by the monitoring indication information for the cells includes non-all-zero bits, with respect to the Pcell and the Scell indicated by the monitoring indication information for the cells, restoring the first PDCCH monitoring.

In this regard, through the above modes, the UE in the embodiments of the present disclosure may determine the next PDCCH monitoring occasion, which includes a next PDCCH monitoring occasion in the first PDCCH monitoring, and a next PDCCH monitoring occasion when the first PDCCH monitoring has been changed (i.e., the first target PDCCH monitoring occasion). For example, the network device may continue to transmit the downlink signaling and/or power-saving signaling at the next PDCCH monitoring occasion when the first PDCCH monitoring has been changed, and the downlink signaling carries the PDCCH monitoring indication information and/or the monitoring indication information for the cells. Here, through the cooperation of the monitoring indication information for the cells and the PDCCH monitoring indication information, it is able to determine the cell to be monitored and the monitoring occasion.

In addition, in a possible embodiment of the present disclosure, prior to Step 21, the UE may further receive first downlink signaling carrying the PDCCH monitoring indication information and/or the monitoring indication information for the cells from the network device, and when the PDCCH monitoring indication information and/or the monitoring indication information for the cells in the first downlink signaling indicates that the first PDCCH monitoring is to be changed, determine a second target PDCCH monitoring occasion in accordance with the PDCCH monitoring indication information and/or the monitoring indication information for the cells carried in the first downlink signaling and/or high layer signaling. Then, in Step 21, the UE may monitor and receive the power-saving signaling at the second target PDCCH monitoring occasion.

As a specific instance, when data scheduled by the first downlink signaling is a last data packet for the UE, the PDCCH monitoring indication information and/or the monitoring indication information for the cells in the first downlink signaling are used to indicate that the first PDCCH monitoring is to be changed, and when the data scheduled by the first downlink signaling is not the last data packet for the UE, the PDCCH monitoring indication information and/or the monitoring indication information for the cells in the first downlink signaling are used to indicate that the first PDCCH monitoring is not to be changed.

The method for monitoring the PDCCH has been described hereinabove at a UE side, and it will be described hereinafter at a network side.

Figure 3:
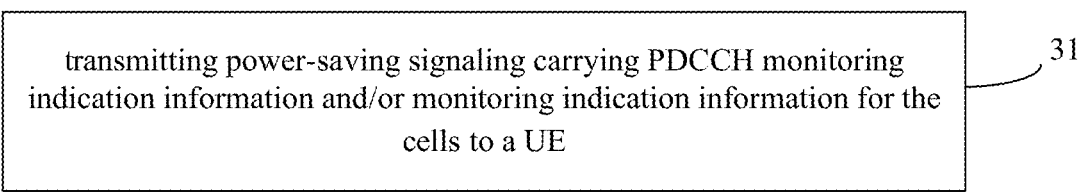
FIG. 3 is another flow chart of the method for monitoring the PDCCH according to some embodiments of the present disclosure.

As shown in FIG. 3, the present disclosure provides in some embodiments a method for PDCCH monitoring for a network device (e.g., base station), which includes Step 31 of transmitting power-saving signaling carrying PDCCH monitoring indication information and/or monitoring indication information for the cells to a UE. The PDCCH monitoring indication information is used to indicate whether to change first PDCCH monitoring, the first PDCCH monitoring is periodic PDCCH monitoring within a search space configured for the UE, and the monitoring indication information for the cells is used to indicate a cell where the PDCCH monitoring needs to be performed.

Through the above step, the network device in the embodiments of the present disclosure may control the UE to monitor the PDCCH flexibly. For example, the network device may determine whether it is necessary to control a certain UE to skip the first PDCCH monitoring in accordance with various strategies. The changing the first PDCCH monitoring includes kipping the first PDCCH monitoring, changing a PDCCH monitoring periodicity of the first PDCCH monitoring, etc. To be specific, when there is no data to be transmitted to the UE in a cache, the network device may transmit the power-saving signal, and control the UE to skip the first PDCCH monitoring on the Pcell and/or the Scell. For another example, during the scheduling of the data transmission for the UE, the network device may determine whether it is necessary to control the UE to skip the first PDCCH monitoring on the Pcell and/or the Scell in accordance with remaining data.

In a possible embodiment of the present disclosure, the PDCCH monitoring indication information includes at least one of first indication information indicating whether to skip the first PDCCH monitoring, second indication information indicating whether to skip the first PDCCH monitoring and indicating a next PDCCH monitoring occasion when the first PDCCH monitoring has been skipped, third indication information indicating whether to change a PDCCH monitoring periodicity and indicating to perform the PDCCH monitoring according to the changed PDCCH monitoring periodicity, and fourth indication information indicating whether to change the PDCCH monitoring periodicity and indicating the changed PDCCH monitoring periodicity or an index corresponding to the changed PDCCH monitoring periodicity.

In a possible embodiment of the present disclosure, the monitoring indication information for the cells includes at least one of fifth indication information indicating a first quantity of Scells where the monitoring is to be performed, and sixth indication information indicating information about the Scells where the monitoring is to be performed.

Further, when the Scell indicated by the fifth indication information or the sixth indication information includes all-zero bits, it means that the monitoring is merely to be performed on the Pcell, and when the Scell indicated by the fifth indication information or the sixth indication information includes non-all-zero bits, it means that the monitoring is to be performed on the Pcell and the Scell indicated by the fifth indication information or the sixth indication information. In addition, more detailed description about the fifth/sixth indication information may refer to that mentioned hereinabove, and thus will not be particularly defined herein.

In addition, more detailed description about the pieces of indication information may refer to that mentioned hereinabove, and thus will not be particularly defined herein.

In a possible embodiment of the present disclosure, when the PDCCH monitoring indication information is the first indication information, the network device may further configure a next PDCCH monitoring occasion for the UE through high layer signaling when the first PDCCH monitoring has been skipped.

In a possible embodiment of the present disclosure, when the PDCCH monitoring indication information is the third indication information, the network device may further configure the changed PDCCH monitoring periodicity for the UE through high layer signaling.

In a possible embodiment of the present disclosure, when the PDCCH monitoring indication information is the fourth indication information, the network device may further configure a correspondence between different values of the fourth indication information and the changed PDCCH monitoring periodicities for the UE through high layer signaling.

In a possible embodiment of the present disclosure, when the monitoring indication information for the cells is the fifth indication information, the network device may perform the following steps so as to help the UE to determine the Scell to be monitored: 1) configuring an Scell list of the first quantity of Scells for the UE through high layer signaling; or 2) configuring a correspondence between different quantities of Scells and Scell lists for the UE through high layer signaling; or 3) selecting the first quantity of Scells from a plurality of Scells in accordance with a predetermined ranking algorithm.

In a possible embodiment of the present disclosure, prior to transmitting the power-saving signaling to the UE at the target PDCCH monitoring occasion, the network device may further: set the PDCCH monitoring indication information and/or the monitoring indication information for the cells in the power-saving signaling transmitted at the target PDCCH monitoring occasion in accordance with a first condition, the first condition including at least one of whether the UE needs to continue to change the first PDCCH monitoring and a next target PDCCH monitoring occasion for the UE when the UE needs to continue to change the first PDCCH monitoring; and set the monitoring indication information for the cells in the power-saving signaling in accordance with a cell where the first PDCCH monitoring needs to be performed or a cell to be monitored at the next target PDCCH monitoring occasion.

In Step 31, when the PDCCH monitoring indication information and/or the monitoring indication information for the cells in the power-saving signaling indicate that the first PDCCH monitoring is to be changed, the network device may further determine a first target PDCCH monitoring occasion in accordance with the PDCCH monitoring indication information and/or the monitoring indication information for the cells carried in the power-saving signaling and/or high layer signaling, and transmit downlink signaling and/or the power-saving signaling to the UE at the first target PDCCH monitoring occasion. The downlink signaling carries the PDCCH monitoring indication information and/or the monitoring indication information for the cells.

Through the above step, it is able to control the UE to change the first PDCCH monitoring, and continue to monitor the first downlink signaling and/or power-saving signaling at a new PDCCH monitoring occasion indicated by the network device.

In a possible embodiment of the present disclosure, prior to Step 31, the network device may further transmit first downlink signaling carrying the PDCCH monitoring indication information and/or the monitoring indication information for the cells to the UE.

To be specific, prior to transmitting the first downlink signaling, the network device may further set the PDCCH monitoring indication information and/or the monitoring indication information for the cells in the first downlink signaling transmitted at the target PDCCH monitoring occasion in accordance with a first condition, and the first condition includes at least one of whether the UE needs to continue to change the first PDCCH monitoring, and a next target PDCCH monitoring occasion for the UE when the UE needs to continue to change the first PDCCH monitoring.

To be specific, when data scheduled by the first downlink signaling is a last data packet for the UE, the PDCCH monitoring indication information and/or the monitoring indication information for the cells in the first downlink signaling are used to indicate that the first PDCCH monitoring is to be changed, and when the data scheduled by the first downlink signaling is not the last data packet for the UE, the PDCCH monitoring indication information and/or the monitoring indication information for the cells in the first downlink signaling are used to indicate that the first PDCCH monitoring is not to be changed.

In addition, in the embodiments of the present disclosure, after the UE is indicated to change the first PDCCH monitoring through the downlink signaling and/or the power-saving signaling, the network device may further determine whether the UE needs to continue to change the first PDCCH monitoring in accordance with an arrival situation of new data of the UE, so as to adjust a PDCCH monitoring behavior of the UE. For example, when the new data arrives at the UE, the network device may further determine that the UE does not need to continue to change the first PDCCH monitoring, and when no new data arrives at the UE, the network device may determine that the UE needs to continue to change the first PDCCH monitoring.

The method has been described hereinabove from the UE side and the network side. The method will be described hereinafter in more details in conjunction with several embodiments.

First Embodiment: 5-Bit Monitoring Indication Information for the Cells is Adopted Base Station Side 1. PDCCH monitoring change indication information is introduced into scheduling DCI, so as to indicate the UE whether to change a PDCCH monitoring behavior on a Pcell or Scell. Each Scell or Scell group is indicated through the PDCCH monitoring indication information in the corresponding scheduling DCI.

2. When scheduling a last data packet, the base station transmits the PDCCH monitoring indicator including non-all-zero bits to the UE through the DCI, so as to indicate the UE to change the PDCCH monitoring. Here, the DCI includes DCI scheduled by the Pcell and all activated Scells.

1) When the first form is adopted by the PDCCH monitoring indication information and it is "1", the PDCCH monitoring is skipped on a corresponding cell, and a next PDCCH monitoring occasion is preconfigured through high layer signaling.

2) When the second form is adopted by the PDCCH monitoring indication information and it is "01", the PDCCH monitoring is skipped on a corresponding cell, and the monitoring is performed at an $(N_1)^{th}$ monitoring occasion.

3) When the third form is adopted by the PDCCH monitoring indication information and it is "1", a PDCCH monitoring periodicity on a corresponding cell is changed, and the changed monitoring periodicity is configured through high layer signaling.

4) When the fourth form is adopted by the PDCCH monitoring indication information and it is "01", the PDCCH monitoring periodicity on the corresponding cell is adjusted to $K_2$.

Further, the above change of the PDCCH monitoring is described by taking merely one search space as an example, and it may also be applied to a plurality of search spaces. The PDCCH monitoring information for the plurality of search spaces may indicate a same action or different actions.

3. After the change of the PDCCH monitoring has been triggered, the base station transmits the PDCCH monitoring indication information and corresponding monitoring indication information for the cells to the UE through the power-saving signaling.

4. When there is no downlink data that is being scheduled, the monitoring indication information for the cells includes all-zero bits, and the PDCCH monitoring indication information includes non-all-zero bits. The UE monitors a subsequent PDCCH monitoring change mode mainly through the power-saving signaling, and a specific indication form may refer to the above item 2.

5. When data arrives at or before the PDCCH monitoring occasion, the base station indicates the UE to monitor the Scells through the monitoring indication information for the cells carried in the power-saving signaling, and resets the PDCCH monitoring indication information to 0, so as to indicate the UE to monitor the PDCCH at a next PDCCH monitoring occasion.

When the 5-bit monitoring indication information for the cells is adopted and it includes all-zero bits, it means that the UE merely needs to monitor the PDCCH on the Pcell at the next monitoring occasion and waits for data scheduling.

When the 5-bit monitoring indication information for the cells is adopted and it includes non-all-zero bits, e.g., 00010, the UE may monitor the PDCCH in accordance with the quantity of Scells or Scell groups indicated by the monitoring indication information for the cells, i.e., $M=((00010)_{10}=4$ Scells or Scell groups. To be specific, the to-be-monitored Scells or Scell groups may be determined as follows.

First mode: the to-be-monitored Scells or Scell groups are semi-statically configured through high layer signaling.

The base station may configure the to-be-monitored Scells or Scell groups through high layer signaling from the Pcell.

Second mode: lists consisting of different quantities of Scells or Scell groups are preconfigured through high layer signaling.

The base station may preconfigure lists of Scells or Scell groups with respect to the power-saving signaling, and the lists include different quantities of Scells, as shown in the following Table.

| The quantity of Scells or Scell groups | Scell or Scell group list |
|---|---|
| 1 | {Scell(s)1} |
| 2 | {Scell(s)21, Scell(s)22} |
| 3 | {Scell(s)31, Scell(s)32, Scell(s)33} |
| ... | ... |
| M = 2N − 1 | {Scell(s)M1, Scell(s)M2, . . . , Scell(s)MM} |

Here, Scell(s)i and Scell(s)j represent indices of the Scells or Scell groups configured through high layer signaling. The indices in different lists may be the same or different.

Third mode: the Scells are ranked in accordance with a ranking algorithm agreed by the base station and the UE, first M Scells are selected from the Scells.

Due to the ranking algorithm agreed by the base station and the UE, the base station merely needs to indicate the quantity of to-be-monitored Scells.

When an Scell is in a deactivated state due to the receipt of a deactivation command or the expiration of an Scell deactivation timer, 1) if the power-saving signaling is not provided with an Scell activation function, the base station may activate a corresponding Scell through an Scell activation command from an MAC CE of the Pcell, and 2) if the power-saving signaling is provided with the Scell activation function, the base station may configure the Scell list through high layer signaling from the Pcell.

When all the Scells are in an activated state, the base station does not need to activate a corresponding Scell.

UE Side

1. When the UE is capable of obtaining the PDCCH monitoring indication information in the scheduling DCI, the UE may change a subsequent PDCCH monitoring action in accordance with the PDCCH monitoring indication information.

1) When the first form is adopted by the PDCCH monitoring indication information and it is "1", the PDCCH monitoring is skipped on a corresponding cell, and a next PDCCH monitoring occasion is preconfigured through high layer signaling.

2) When the second form is adopted by the PDCCH monitoring indication information and it is "01", the PDCCH monitoring is skipped on a corresponding cell, and the monitoring is performed at an $(N_1)^{th}$ monitoring occasion.

3) When the third form is adopted by the PDCCH monitoring indication information and it is "1", a PDCCH monitoring periodicity on a corresponding cell is changed, and the changed monitoring periodicity is configured through high layer signaling.

4) When the fourth form is adopted by the PDCCH monitoring indication information and it is "01", the PDCCH monitoring periodicity on the corresponding cell is adjusted to $K_2$.

For example, when there is no data transmission, the base station may indicate the UE to skip the PDCCH monitoring on all the cells (including the Pcell and the Scells) through the scheduling DCI, and the PDCCH monitoring indication information includes non-all-zero bits.

2. Upon the receipt of a PDCCH change indicator in the downlink signaling, i.e., the scheduling DCI, the UE may monitor the power-saving signaling in accordance with an action indicated by the PDCCH monitoring indication information, and change the PDCCH monitoring on all the cells (including the Pcell and the Scells).

3. When there is no data transmission, the UE may mainly monitor the power-saving signaling. At this time, the PDCCH monitoring indicator carried in the power-saving signaling includes non-all-zero bits, and the monitoring indication information for the cells includes all-zero bits. The PDCCH monitoring indicator is a subsequent monitoring occasion of the power-saving signaling.

4. When the PDCCH monitoring indication information in the power-saving signaling received by the UE includes all-zero bits, the UE may monitor the PDCCH on a corresponding cell at a next PDCCH monitoring occasion.

A) When the monitoring indication information for the cells includes all-zero bits, the UE merely needs to monitor the PDCCH on the Pcell.

B) When the monitoring indication information for the cells includes non-all-zero bits, e.g., 00010, apart from monitoring the Pcell, the UE also needs to determine four to-be-monitored Scells in accordance with the quantity of Scells indicated by the monitoring indication information for the cells, i.e., $M=(00010)_{10}=4$ Scells.

With respect to different methods for indicating the Scell list, the monitoring indication information for the cells obtained by the UE may be different.

First mode: semi-static configuration through high-layer signaling

The monitoring indication information for the cells is obtained through high layer signaling from the Pcell, and the EU needs to monitor the PDCCH on the corresponding Scell(s).

Second mode: lists of different quantity of Scells are preconfigured through high layer signaling.

Because a list of the monitoring indication information for the cells has been preconfigured by the base station through high layer signaling, the UE merely needs to monitor the PDCCH on the corresponding Scell(s) in accordance with the Scell list.

Third mode: the Scell(s) are ranked in accordance with a ranking algorithm agreed by the base station and the UE, and first M Scells are selected from these Scells.

When the quantity of activated Scells is greater than or equal to M, the M Scells may be selected as follows.
   a) The Scells may be ranked in accordance with time lengths of the sCellDeactivationTimer before expiration, and then first four Scells may be selected.
   b) The Scells may be ranked in accordance with historical Scell channel quality, e.g., Reference Signal Received Power (RSRP)/Reference Signal Received Quality (RSRQ)/Chanel Quality Indicator (CQI).
   c) Latest four Scells for scheduling the data are selected.

It should be noted that, the above description has been given by taking the ranking algorithm as an example, and the determination of the Scells will not be limited thereto.

When the quantity of activated Scells is smaller than M, the UE may receive the power-saving signaling or MAC CE carrying the Scell activation command from the base station, and monitor the PDCCH on the Scell(s).

Second Embodiment: 32-Bit Monitoring Indication Information for the Cells is Adopted Base Station Side 1. The PDCCH Monitoring Change Indication Information is Introduced into the scheduling DCI to indicate the UE whether to change a PDCCH monitoring action on the Pcell or Scell. Each Scell is indicated through the PDCCH monitoring indication information in the corresponding scheduling DCI.

2. When scheduling a last data packet, the base station transmits the PDCCH monitoring indicator including non-all-zero bits to the UE through the DCI, so as to indicate the UE to change the PDCCH monitoring. Here, the DCI includes DCI scheduled by the Pcell and all activated Scells.
   1) When the first form is adopted by the PDCCH monitoring indication information and it is "1", the PDCCH monitoring is skipped on a corresponding cell, and a next PDCCH monitoring occasion is preconfigured through high layer signaling.
   2) When the second form is adopted by the PDCCH monitoring indication information and it is "01", the PDCCH monitoring is skipped on a corresponding cell, and the monitoring is performed at an $(N_1)^{th}$ monitoring occasion.
   3) When the third form is adopted by the PDCCH monitoring indication information and it is "1", a PDCCH monitoring periodicity on a corresponding cell is changed, and the changed monitoring periodicity is configured through high layer signaling.
   4) When the fourth form is adopted by the PDCCH monitoring indication information and it is "01", the PDCCH monitoring periodicity on the corresponding cell is adjusted to $K_2$.

Further, the above change of the PDCCH monitoring is described by taking merely one search space as an example, and it may also be applied to a plurality of search spaces. The PDCCH monitoring information for the plurality of search spaces may indicate a same action or different actions.

3. After the change of the PDCCH monitoring has been triggered, the base station transmits the PDCCH monitoring indication information and corresponding monitoring indication information for the cells to the UE through the power-saving signaling.

4. When there is no downlink data that is being scheduled, the monitoring indication information for the cells include all-zero bits, and the PDCCH monitoring indication information includes non-all-zero bits. The UE monitors a subsequent PDCCH monitoring change mode mainly through the power-saving signaling, and a specific indication form may refer to the above item 2.

5. When data arrives at or before the PDCCH monitoring occasion, the base station indicates the UE to monitor the Scells through the monitoring indication information for the cells carried in the power-saving signaling, and resets the PDCCH monitoring indication information to 0, so as to indicate the UE to monitor the PDCCH at a next PDCCH monitoring occasion.

When the Scell(s) includes all-zero bits, it means that the UE merely needs to monitor the PDCCH on the Pcell at the next monitoring occasion and waits for data scheduling.

When 31-bit monitoring indication information for the cells is adopted and it includes non-all-zero bits, e.g., 01000000 1000000 00000001 0000100, i.e., Scell indices {2, 9, 24, 29} are indicated, the UE may monitor the PDCCH in accordance with the Scells indicated by the monitoring indication information for the cells.

When an Scell is in a deactivated state due to the receipt of a deactivation command or the expiration of an Scell deactivation timer, 1) if the power-saving signaling is not provided with an Scell activation function, the base station may activate a corresponding Scell through an Scell activation command from an MAC CE of the Pcell, and 2) if the power-saving signaling is provided with the Scell activation function, the base station may configure the Scell list through high layer signaling from the Pcell.

When all the Scells are in an activated state, the base station does not need to activate a corresponding Scell.

It should be appreciated that, the above-mentioned method is also adapted to indicate the Scell group, which will not be particularly defined herein.

UE Side

1. When the UE is capable of obtaining the PDCCH monitoring indication information in the scheduling DCI, the UE may implement a subsequent PDCCH monitoring action in accordance with the PDCCH monitoring indication information.
   1) When the first form is adopted by the PDCCH monitoring indication information and it is "1", the PDCCH monitoring is skipped on a corresponding cell, and a next PDCCH monitoring occasion is preconfigured through high layer signaling.
   2) When the second form is adopted by the PDCCH monitoring indication information and it is "01", the PDCCH monitoring is skipped on a corresponding cell, and the monitoring is performed at an $(N_1)^{th}$ monitoring occasion.
   3) When the third form is adopted by the PDCCH monitoring indication information and it is "1", a PDCCH monitoring periodicity on a corresponding cell is changed, and the changed monitoring periodicity is configured through high layer signaling.
   4) When the fourth form is adopted by the PDCCH monitoring indication information and it is "01", the PDCCH monitoring periodicity on the corresponding cell is adjusted to $K_2$.

For example, when there is no data transmission, the base station may indicate the UE to skip the PDCCH monitoring on all the cells (including the Pcell and the Scells) through the scheduling DCI, and the PDCCH monitoring indication information includes non-all-zero bits.

2. Upon the receipt of a PDCCH change indicator in the downlink signaling, i.e., the scheduling DCI, the UE may monitor the power-saving signaling in accordance with an action indicated by the PDCCH monitoring indication information, and skip the PDCCH monitoring on all the cells (including the Pcell and the Scells).

3. When there is no data transmission, the UE may mainly monitor the power-saving signaling. At this time, the PDCCH monitoring indicator carried in the power-saving signaling includes non-all-zero bits, and the monitoring indication information for the cells includes all-zero bits. The PDCCH monitoring indicator is a subsequent monitoring occasion of the power-saving signaling.

4. When there is new data arriving at the UE and the PDCCH monitoring indication information in the power-saving signaling received by the UE includes all-zero bits, the UE may monitor the PDCCH on a corresponding cell at a next PDCCH monitoring occasion.

a) When the monitoring indication information for the cells includes all-zero bits, the UE merely needs to monitor the PDCCH on the Pcell.

b) When the monitoring indication information for the cells includes non-all-zero bits, apart from the Pcell, the UE also needs to monitor the PDCCH on the indicated Scell in accordance with the monitoring indication information for the cells, e.g., 01000000 1000000 00000001 0000100, i.e., Scell indices {2, 9, 24, 29}.

The methods have been described hereinabove, and apparatuses for implementing the above-mentioned methods will be described hereinafter.

Figure 4:
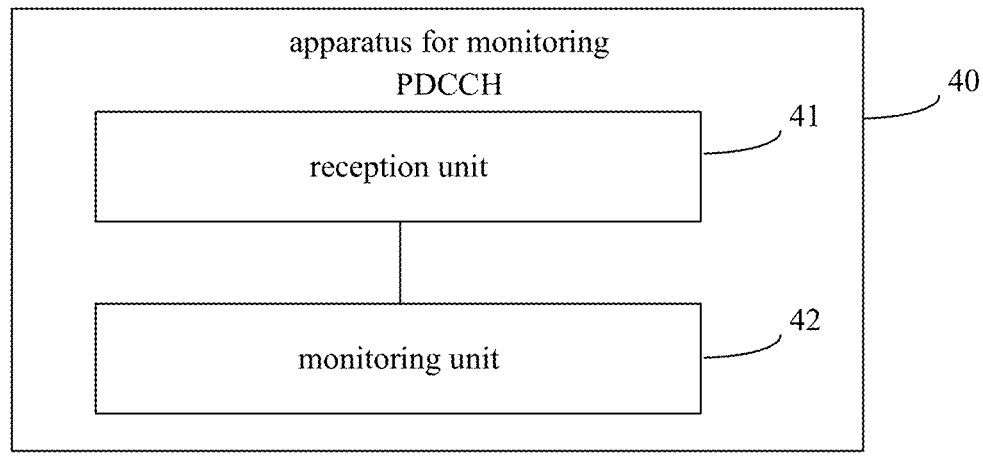
FIG. 4 is a structural view of an apparatus for PDCCH monitoring according to some embodiments of the present disclosure.

As shown in FIG. 4, the present disclosure provides in some embodiments an apparatus 40 for PDCCH monitoring, which includes: a reception unit 41 configured to receive power-saving signaling carrying PDCCH monitoring indication information and/or monitoring indication information for the cells from a network device, the PDCCH monitoring indication information being used to indicate whether to change first PDCCH monitoring, the first PDCCH monitoring being periodic PDCCH monitoring within a search space configured for a UE, and the monitoring indication information for the cells being used to indicate a cell where the PDCCH monitoring needs to be performed; and a determination unit 42 configured to monitor the PDCCH in accordance with the PDCCH monitoring indication information and/or the monitoring indication information for the cells in the power-saving signaling.

In a possible embodiment of the present disclosure, the PDCCH monitoring indication information includes at least one of first indication information indicating whether to skip the first PDCCH monitoring, second indication information indicating whether to skip the first PDCCH monitoring and indicating a next PDCCH monitoring occasion when the first PDCCH monitoring has been skipped, third indication information indicating whether to change a PDCCH monitoring periodicity and indicating to perform the PDCCH monitoring according to the changed PDCCH monitoring periodicity, and fourth indication information indicating whether to change the PDCCH monitoring periodicity and indicating the changed PDCCH monitoring periodicity or an index corresponding to the changed PDCCH monitoring periodicity.

In a possible embodiment of the present disclosure, the reception unit is further configured to: when the PDCCH monitoring indication information is the first indication information, receive a next PDCCH monitoring occasion that is configured by the network device for the UE through high layer signaling and occurs when the first PDCCH monitoring has been skipped; and when the first indication information indicates that the first PDCCH monitoring is to be skipped, determine the next PDCCH monitoring occasion that occurs when the first PDCCH monitoring has been skipped in accordance with the high layer signaling.

In a possible embodiment of the present disclosure, the reception unit is further configured to: when the PDCCH monitoring indication information is the third indication information, receive the changed PDCCH monitoring periodicity configured by the network device for the UE through high layer signaling; and determine the next PDCCH monitoring occasion that occurs when the first PDCCH monitoring has been changed in accordance with the changed PDCCH monitoring periodicity configured through the high layer signaling.

In a possible embodiment of the present disclosure, the reception unit is further configured to: when the PDCCH monitoring indication information is the fourth indication information, receive a correspondence between different values of the fourth indication information and the changed PDCCH monitoring periodicities configured by the network device for the UE through high layer signaling; and when the fourth indication information indicates that the PDCCH monitoring periodicity is to be changed, determine the changed PDCCH monitoring periodicity corresponding to the fourth indication information or an index corresponding to the changed PDCCH monitoring periodicity in accordance with the correspondence configured through the high layer signaling, and determine the next PDCCH monitoring occasion when the first PDCCH monitoring has been skipped.

In a possible embodiment of the present disclosure, the monitoring indication information for the cells includes at least one of fifth indication information indicating a first quantity of Scells where the monitoring is to be performed, and sixth indication information indicating information about the Scells where the monitoring is to be performed.

In a possible embodiment of the present disclosure, when the monitoring indication information for the cells is the fifth indication information, the Scell indicated by the fifth indication information is determined in accordance with an Scell list of the first quantity of Scells configured through high layer signaling, or the Scell list of the first quantity of Scells is determined in accordance with a correspondence between different quantities of Scells and Scell lists configured through high layer signaling, or the first quantity of Scells are selected from a plurality of Scells in accordance with a predetermined ranking algorithm.

In a possible embodiment of the present disclosure, the monitoring unit is further configured to: when the PDCCH monitoring indication information and/or the monitoring indication information for the cells in the power-saving signaling indicates that the first PDCCH monitoring is to be changed, determine a first target PDCCH monitoring occasion in accordance with the PDCCH monitoring indication information and/or the monitoring indication information for the cells carried in the power-saving signaling and/or high layer signaling; and monitor downlink signaling and/or the power-saving signaling from the network device at the first target PDCCH occasion. The downlink signaling carries the PDCCH monitoring indication information and/or monitoring indication information for the cells.

In a possible embodiment of the present disclosure, the monitoring unit is further configured to change or restore the first PDCCH monitoring in accordance with the PDCCH monitoring indication information and/or the monitoring indication information for the cells in the power-saving signaling and/or the downlink signaling monitored at the first target PDCCH monitoring occasion.

In a possible embodiment of the present disclosure, the monitoring unit is further configured to: determine whether to change the first PDCCH monitoring in accordance with the PDCCH monitoring indication information and/or the monitoring indication information for the cells in the power-saving signaling and/or the downlink signaling monitored at the first target PDCCH monitoring occasion; when the first PDCCH monitoring is determined to be changed, determine a next target PDCCH monitoring occasion in accordance with high layer signaling and the PDCCH monitoring indication information and/or the monitoring indication information for the cells monitored at the first target PDCCH monitoring occasion, and continue to monitor the downlink signaling and/or the power-saving signaling from the network device at the next target PDCCH monitoring occasion; and when the first PDCCH monitoring is determined to be not changed, restore the first PDCCH monitoring.

In a possible embodiment of the present disclosure, the monitoring unit is further configured to: when the Scell indicated by the monitoring indication information for the cells includes all-zero bits, with respect to a Pcell, monitor the downlink signaling and/or the power-saving signaling from the network device at the next target PDCCH monitoring occasion; and when the Scell indicated by the monitoring indication information for the cells includes non-all-zero bits, with respect to the Pcell and the Scell indicated by the monitoring indication information for the cells, monitor the downlink signaling and/or the power-saving signaling from the network device at the next target PDCCH monitoring occasion.

In a possible embodiment of the present disclosure, the monitoring unit is further configured to: when the Scell indicated by the monitoring indication information for the cells includes all-zero bits, with respect to a Pcell, restore the first PDCCH monitoring; and when the Scell indicated by the monitoring indication information for the cells includes non-all-zero bits, with respect to the Pcell and the Scell indicated by the monitoring indication information for the cells, restore the first PDCCH monitoring.

In a possible embodiment of the present disclosure, prior to receiving the power-saving signaling, the reception unit is further configured to: receive first downlink signaling carrying the PDCCH monitoring indication information and/or the monitoring indication information for the cells from the network device; when the PDCCH monitoring indication information and/or the monitoring indication information for the cells in the first downlink signaling indicates that the first PDCCH monitoring is to be changed, determine a second target PDCCH monitoring occasion in accordance with the PDCCH monitoring indication information and/or the monitoring indication information for the cells carried in the first downlink signaling and/or high layer signaling; and receive the power-saving signaling that carries the PDCCH monitoring indication information and/or the monitoring indication information for the cells from the network device at the second target PDCCH monitoring occasion.

In a possible embodiment of the present disclosure, when data scheduled by the first downlink signaling is a last data packet for the UE, the PDCCH monitoring indication information and/or the monitoring indication information for the cells in the first downlink signaling are used to indicate that the first PDCCH monitoring is to be changed, and when the data scheduled by the first downlink signaling is not the last data packet for the UE, the PDCCH monitoring indication information and/or the monitoring indication information for the cells in the first downlink signaling are used to indicate that the first PDCCH monitoring is not to be changed.

Figure 5:
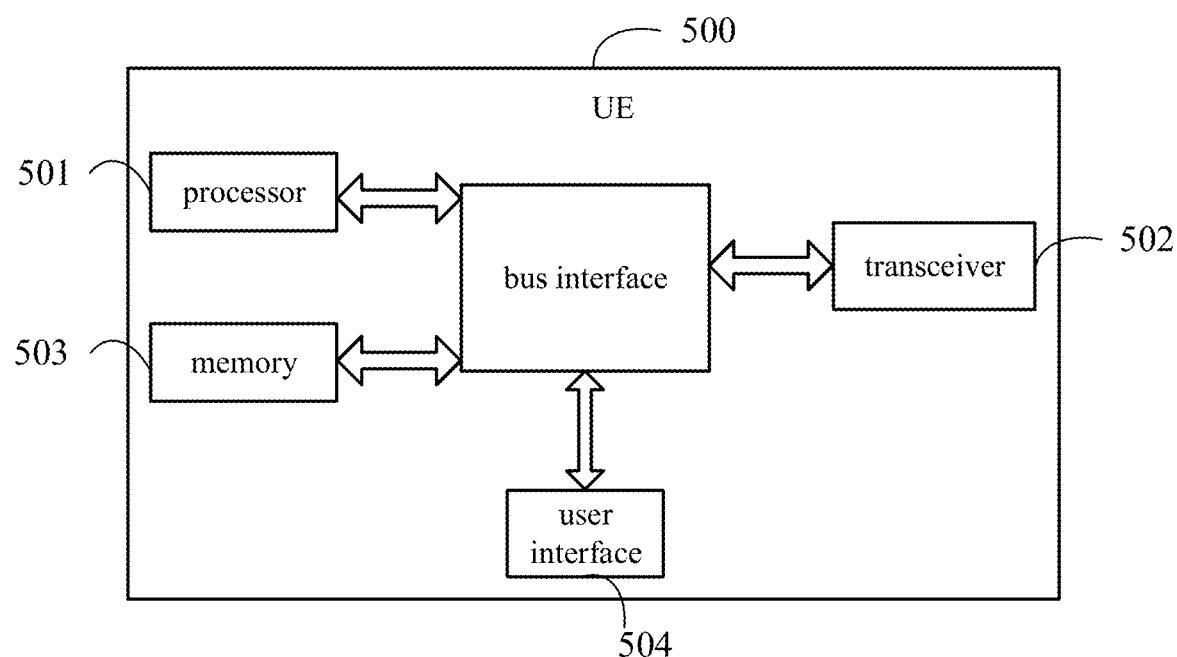
FIG. 5 is a structural view of a UE according to some embodiments of the present disclosure.

As shown in FIG. 5, the present disclosure provides in some embodiments a UE 500, which includes a processor 501, a transceiver 502, a memory 503, a user interface 504 and a bus interface.

In the embodiments of the present disclosure, the UE 500 further includes a computer program stored in the memory 503 and executed by the processor 501.

The transceiver 502 is configured to receive power-saving signaling carrying PDCCH monitoring indication information and/or monitoring indication information for the cells from a network device. The PDCCH monitoring indication information is used to indicate whether to change first PDCCH monitoring, the first PDCCH monitoring is periodic PDCCH monitoring within a search space configured for the UE, and the monitoring indication information for the cells is used to indicate a cell where the PDCCH monitoring needs to be performed. The processor 501 is configured to execute the program so as to monitor the PDCCH in accordance with the PDCCH monitoring indication information and/or the monitoring indication information for the cells in the power-saving signaling.

In FIG. 5, bus architecture may include a number of buses and bridges connected to each other, so as to connect various circuits for one or more processors 501 and one or more memories 503. In addition, the bus architecture may be used to connect any other circuits, such as a circuit for a peripheral device, a circuit for a voltage stabilizer and a power management circuit, which are all known in the art, and therefore, no further description will be given herein. The bus interface may be provided, and the transceiver 502 may consist of a plurality of elements, i.e., a transmitter and a receiver for communication with any other devices over a transmission medium. With respect to different UEs, the user interface 504 may also be provided for devices which are to be arranged inside or outside the UE, and these devices may include but not limited to a keypad, a display, a speaker, a microphone and a joystick.

The processor 501 may take charge of managing the bus architecture as well as general processings. The memory 503 may store therein data for the operation of the processor 501.

In a possible embodiment of the present disclosure, the PDCCH monitoring indication information includes at least one of first indication information indicating whether to skip the first PDCCH monitoring, second indication information indicating whether to skip the first PDCCH monitoring and indicating a next PDCCH monitoring occasion when the first PDCCH monitoring has been skipped, third indication information indicating whether to change a PDCCH monitoring periodicity and indicating to perform the PDCCH monitoring according to the changed PDCCH monitoring periodicity, and fourth indication information indicating whether to change the PDCCH monitoring periodicity and indicating the changed PDCCH monitoring periodicity or an index corresponding to the changed PDCCH monitoring periodicity.

In a possible embodiment of the present disclosure, the processor is further configured to execute the program, so as to: when the PDCCH monitoring indication information is the first indication information, receive a next PDCCH monitoring occasion that is configured by the network device for the UE through high layer signaling and occurs when the first PDCCH monitoring has been skipped; and when the first indication information indicates that the first PDCCH monitoring is to be skipped, determine the next PDCCH monitoring occasion in accordance with the high layer signaling when the first PDCCH monitoring has been skipped.

In a possible embodiment of the present disclosure, the processor is further configured to execute the program, so as to: when the PDCCH monitoring indication information is the third indication information, receive the changed PDCCH monitoring periodicity configured by the network device for the UE through high layer signaling; and determine the next PDCCH monitoring occasion in accordance with the changed PDCCH monitoring periodicity configured through the high layer signaling when the first PDCCH monitoring has been changed.

In a possible embodiment of the present disclosure, the processor is further configured to execute the program, so as to: when the PDCCH monitoring indication information is the fourth indication information, receive a correspondence between different values of the fourth indication information and the changed PDCCH monitoring periodicities configured by the network device for the UE through high layer signaling; and when the fourth indication information indicates that the PDCCH monitoring periodicity is to be changed, determine the changed PDCCH monitoring periodicity corresponding to the fourth indication information or an index corresponding to the changed PDCCH monitoring periodicity in accordance with the correspondence configured through the high layer signaling, and determine the next PDCCH monitoring occasion when the first PDCCH monitoring has been changed.

In a possible embodiment of the present disclosure, the monitoring indication information for the cells includes at least one of fifth indication information indicating a first quantity of Scells where the monitoring is to be performed, and sixth indication information indicating information about the Scells where the monitoring is to be performed.

In a possible embodiment of the present disclosure, when the monitoring indication information for the cells is the fifth indication information, the Scell indicated by the fifth indication information is determined in accordance with an Scell list of the first quantity of Scells configured through high layer signaling, or the Scell list of the first quantity of Scells is determined in accordance with a correspondence between different quantities of Scells and Scell lists configured through high layer signaling, or the first quantity of Scells are selected from a plurality of Scells in accordance with a predetermined ranking algorithm.

In a possible embodiment of the present disclosure, the processor is further configured to execute the program, so as to: when the PDCCH monitoring indication information and/or the monitoring indication information for the cells in the power-saving signaling indicates that the first PDCCH monitoring is to be skipped, determine a first target PDCCH monitoring occasion in accordance with the PDCCH monitoring indication information and/or the monitoring indication information for the cells carried in the power-saving signaling and/or high layer signaling; and monitor downlink signaling and/or the power-saving signaling from the network device at the first target PDCCH occasion. The downlink signaling carries the PDCCH monitoring indication information and/or the monitoring indication information for the cells.

In a possible embodiment of the present disclosure, the processor is further configured to execute the program, so as to change or restore the first PDCCH monitoring in accordance with the PDCCH monitoring indication information and/or the monitoring indication information for the cells in the power-saving signaling and/or the downlink signaling monitored at the first target PDCCH monitoring occasion.

In a possible embodiment of the present disclosure, the processor is further configured to execute the program, so as to: determine whether to change the first PDCCH monitoring in accordance with the PDCCH monitoring indication information and/or the monitoring indication information for the cells in the power-saving signaling and/or the downlink signaling monitored at the first target PDCCH monitoring occasion; when the first PDCCH monitoring is to be changed, determine a next target PDCCH monitoring occasion in accordance with high layer signaling and the PDCCH monitoring indication information and/or the monitoring indication information for the cells monitored at the first target PDCCH monitoring occasion, and continue to monitor the downlink signaling and/or the power-saving signaling from the network device at the next target PDCCH monitoring occasion; and when the first PDCCH monitoring is not to be changed, restore the first PDCCH monitoring.

In a possible embodiment of the present disclosure, the processor is further configured to execute the program, so as to: when the Scell indicated by the monitoring indication information for the cells includes all-zero bits, with respect to a Pcell, monitor the downlink signaling and/or the power-saving signaling from the network device at the next target PDCCH monitoring occasion; and when the Scell indicated by the monitoring indication information for the cells includes non-all-zero bits, with respect to the Pcell and the Scell indicated by the monitoring indication information for the cells, monitor the downlink signaling and/or the power-saving signaling from the network device at the next target PDCCH monitoring occasion.

In a possible embodiment of the present disclosure, the processor is further configured to execute the program, so as to: when the Scell indicated by the monitoring indication information for the cells includes all-zero bits, with respect to a Pcell, restore the first PDCCH monitoring; and when the Scell indicated by the monitoring indication information for the cells includes non-all-zero bits, with respect to the Pcell and the Scell indicated by the monitoring indication information for the cells, restore the first PDCCH monitoring.

In a possible embodiment of the present disclosure, the processor is further configured to execute the program, so as to: prior to receiving the power-saving signaling, receive first downlink signaling carrying the PDCCH monitoring indication information and/or the monitoring indication information for the cells from the network device; when the PDCCH monitoring indication information and/or the monitoring indication information for the cells in the first downlink signaling indicates that the first PDCCH monitoring is to be changed, determine a second target PDCCH monitoring occasion in accordance with the PDCCH monitoring indication information and/or the monitoring indication information for the cells carried in the first downlink signaling and/or high layer signaling; and monitor and receive the power-saving signaling at the second target PDCCH monitoring occasion.

In a possible embodiment of the present disclosure, when data scheduled by the first downlink signaling is a last data packet for the UE, the PDCCH monitoring indication information and/or the monitoring indication information for the cells in the first downlink signaling are used to indicate that the first PDCCH monitoring is to be changed, and when the data scheduled by the first downlink signaling is not the last data packet for the UE, the PDCCH monitoring indication information and/or the monitoring indication information for the cells in the first downlink signaling are used to indicate that the first PDCCH monitoring is not to be changed.

The present disclosure further provides in some embodiments a computer-readable storage medium storing therein a computer program. The computer program is executed by a processor, so as to: receive power-saving signaling carrying PDCCH monitoring indication information and/or monitoring indication information for the cells from a network device, the PDCCH monitoring indication information being used to indicate whether to change first PDCCH monitoring, the first PDCCH monitoring being periodic PDCCH monitoring within a search space configured for a UE, and the monitoring indication information for the cells being used to indicate a cell where the PDCCH monitoring needs to be performed; and monitor the PDCCH in accordance with the PDCCH monitoring indication information and/or the monitoring indication information for the cells in the power-saving signaling.

The program is executed by the processor so as to implement the above-mentioned method for monitoring the PDCCH at a UE side with a same technical effect, which will thus not be particularly defined herein.

Figure 6:
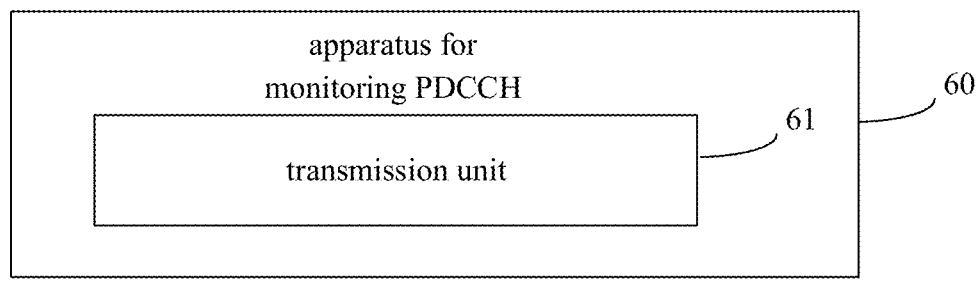
FIG. 6 is another structural view of the apparatus for monitoring the PDCCH according to some embodiments of the present disclosure.

As shown in FIG. 6, the present disclosure provides in some embodiments an apparatus 60 for PDCCH monitoring for a network device, which includes a transmission unit 61 configured to transmit power-saving signaling carrying PDCCH monitoring indication information and/or monitoring indication information for the cells to a UE. The PDCCH monitoring indication information is used to indicate whether to change first PDCCH monitoring, the first PDCCH monitoring is periodic PDCCH monitoring within a search space configured for the UE, and the monitoring indication information for the cells is used to indicate a cell where the PDCCH monitoring needs to be performed.

In a possible embodiment of the present disclosure, the PDCCH monitoring indication information includes at least one of first indication information indicating whether to skip the first PDCCH monitoring, second indication information indicating whether to skip the first PDCCH monitoring and indicating a next PDCCH monitoring occasion when the first PDCCH monitoring has been skipped, third indication information indicating whether to change a PDCCH monitoring periodicity and indicating to perform the PDCCH monitoring according to the changed PDCCH monitoring periodicity, and fourth indication information indicating whether to change the PDCCH monitoring periodicity and indicating the changed PDCCH monitoring periodicity or an index corresponding to the changed PDCCH monitoring periodicity.

In a possible embodiment of the present disclosure, when the PDCCH monitoring indication information is the first indication information, the apparatus further includes a first configuration unit configured to configure a next PDCCH monitoring occasion for the UE through high layer signaling when the first PDCCH monitoring has been skipped.

In a possible embodiment of the present disclosure, when the PDCCH monitoring indication information is the third indication information, the apparatus further includes a second configuration unit configured to configure the changed PDCCH monitoring periodicity for the UE through high layer signaling.

In a possible embodiment of the present disclosure, when the PDCCH monitoring indication information is the fourth indication information, the apparatus further includes a third configuration unit configured to configure a correspondence between different values of the fourth indication information and the changed PDCCH monitoring periodicities for the UE through high layer signaling.

In a possible embodiment of the present disclosure, the monitoring indication information for the cells includes at least one of fifth indication information indicating a first quantity of Scells where the monitoring is to be performed, and sixth indication information indicating information about the Scells where the monitoring is to be performed.

In a possible embodiment of the present disclosure, when the monitoring indication information for the cells is the fifth indication information, the apparatus further includes a fourth configuration unit configured to: configure an Scell list of the first quantity of Scells for the UE through high layer signaling; or configure a correspondence between different quantities of Scells and Scell lists for the UE through high layer signaling; or select the first quantity of Scells from a plurality of Scells in accordance with a predetermined ranking algorithm.

In a possible embodiment of the present disclosure, the transmission unit is further configured to, when the PDCCH monitoring indication information and/or the monitoring indication information for the cells in the power-saving signaling indicate that the first PDCCH monitoring is to be skipped, determine a first target PDCCH monitoring occasion in accordance with the PDCCH monitoring indication information and/or the monitoring indication information for the cells carried in the power-saving signaling and/or high layer signaling, and transmit downlink signaling and/or the power-saving signaling to the UE at the first target PDCCH monitoring occasion. The downlink signaling carries the PDCCH monitoring indication information and/or the monitoring indication information for the cells.

In a possible embodiment of the present disclosure, the transmission unit is further configured to, prior to transmitting the power-saving signaling, transmit first downlink signaling carrying the PDCCH monitoring indication information and/or the monitoring indication information for the cells to the UE.

In a possible embodiment of the present disclosure, when data scheduled by the first downlink signaling is a last data packet for the UE, the PDCCH monitoring indication information and/or the monitoring indication information for the cells in the first downlink signaling are used to indicate that the first PDCCH monitoring is to be changed, and when the data scheduled by the first downlink signaling is not the last data packet for the UE, the PDCCH monitoring indication information and/or the monitoring indication information for the cells in the first downlink signaling are used to indicate that the first PDCCH monitoring is not to be changed.

In a possible embodiment of the present disclosure, after the first downlink signaling indicates the UE to change the first PDCCH monitoring, the apparatus further includes a determination unit configured to, when new data has arrived at the UE, determining that the UE does not need to continue to change the first PDCCH monitoring; and when no new data has arrived at the UE yet, determine that the UE needs to continue to change the first PDCCH monitoring.

Figure 7:
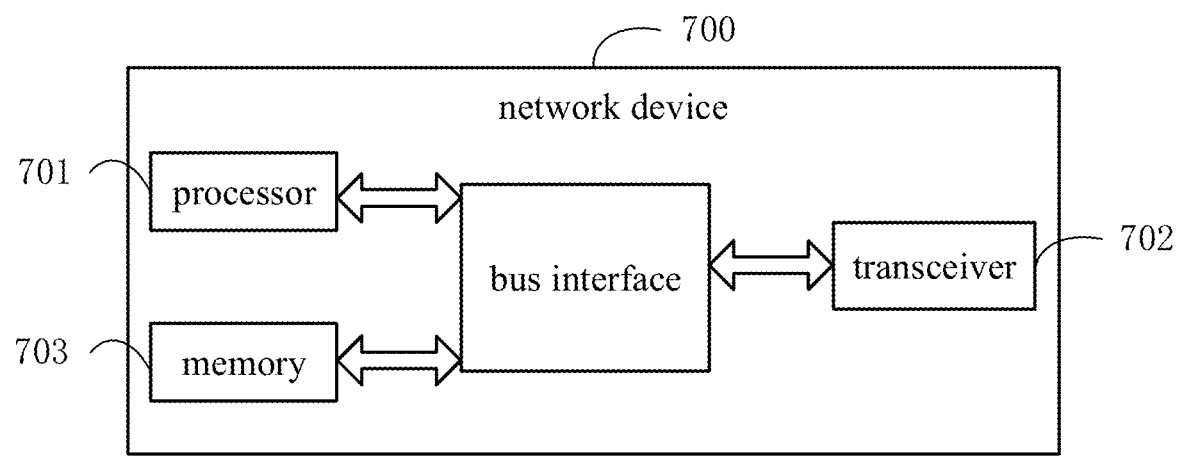
FIG. 7 is a structural view of a network device according to some embodiments of the present disclosure.

As shown in FIG. 7, the present disclosure provides in some embodiments a first network device 700, which includes a processor 701, a transceiver 702, a memory 703 and a bus interface. The transceiver 702 is configured to transmit power-saving signaling carrying PDCCH monitoring indication information and/or monitoring indication information for the cells to a UE. The PDCCH monitoring indication information is used to indicate whether to change first PDCCH monitoring, the first PDCCH monitoring is periodic PDCCH monitoring within a search space configured for the UE, and the monitoring indication information for the cells is used to indicate a cell where the PDCCH monitoring needs to be performed.

In FIG. 7, bus architecture may include a number of buses and bridges connected to each other, so as to connect various circuits for one or more processors 701 and one or more memories 703. In addition, the bus architecture may be used to connect any other circuits, such as a circuit for a peripheral device, a circuit for a voltage stabilizer and a power management circuit, which are all known in the art, and therefore, no further description will be given herein. The bus interface may be provided, and the transceiver 702 may consist of a plurality of elements, i.e., a transmitter and a receiver for communication with any other devices over a transmission medium.

The processor 701 may take charge of managing the bus architecture as well as general processings. The memory 703 may store therein data for the operation of the processor 701.

In a possible embodiment of the present disclosure, the PDCCH monitoring indication information includes at least one of first indication information indicating whether to skip the first PDCCH monitoring, second indication information indicating whether to skip the first PDCCH monitoring and indicating a next PDCCH monitoring occasion when the first PDCCH monitoring has been skipped, third indication information indicating whether to change a PDCCH monitoring periodicity and indicating to perform the PDCCH monitoring according to the changed PDCCH monitoring periodicity, and fourth indication information indicating whether to change the PDCCH monitoring periodicity and indicating the changed PDCCH monitoring periodicity or an index corresponding to the changed PDCCH monitoring periodicity.

In a possible embodiment of the present disclosure, when the PDCCH monitoring indication information is the first indication information, the processor 701 is configured to execute a program, so as to configure a next PDCCH monitoring occasion for the UE through high layer signaling when the first PDCCH monitoring has been skipped.

In a possible embodiment of the present disclosure, when the PDCCH monitoring indication information is the third indication information, the processor 701 is configured to execute the program, so as to configure the changed PDCCH monitoring periodicity for the UE through high layer signaling.

In a possible embodiment of the present disclosure, when the PDCCH monitoring indication information is the fourth indication information, the processor 701 is configured to execute the program, so as to configure a correspondence between different values of the fourth indication information and the changed PDCCH monitoring periodicities for the UE through high layer signaling.

In a possible embodiment of the present disclosure, the monitoring indication information for the cells includes at least one of fifth indication information indicating a first quantity of Scells where the monitoring is to be performed, and sixth indication information indicating information about the Scells where the monitoring is to be performed.

In a possible embodiment of the present disclosure, when the monitoring indication information for the cells is the fifth indication information, the processor 701 is further configured to execute the program, so as to: configure an Scell list of the first quantity of Scells for the UE through high layer signaling; or configure a correspondence between different quantities of Scells and Scell lists for the UE through high layer signaling; or select the first quantity of Scells from a plurality of Scells in accordance with a predetermined ranking algorithm.

In a possible embodiment of the present disclosure, the processor 701 is further configured to execute the program, so as to, when the PDCCH monitoring indication information and/or the monitoring indication information for the cells in the power-saving signaling indicate that the first PDCCH monitoring is to be skipped, determine a first target PDCCH monitoring occasion in accordance with the PDCCH monitoring indication information and/or the monitoring indication information for the cells carried in the power-saving signaling and/or high layer signaling, and transmit downlink signaling and/or the power-saving signaling to the UE at the first target PDCCH monitoring occasion. The downlink signaling carries the PDCCH monitoring indication information and/or the monitoring indication information for the cells.

In a possible embodiment of the present disclosure, the processor 701 is further configured to execute the program, so as to, prior to transmitting the power-saving signaling, transmit first downlink signaling carrying the PDCCH monitoring indication information and/or the monitoring indication information for the cells to the UE.

In a possible embodiment of the present disclosure, when data scheduled by the first downlink signaling is a last data packet for the UE, the PDCCH monitoring indication information and/or the monitoring indication information for the cells in the first downlink signaling are used to indicate that the first PDCCH monitoring is to be changed, and when the data scheduled by the first downlink signaling is not the last data packet for the UE, the PDCCH monitoring indication information and/or the monitoring indication information for the cells in the first downlink signaling are used to indicate that the first PDCCH monitoring is not to be changed.

In a possible embodiment of the present disclosure, the processor 701 is further configured to execute the program, so as to: after the first downlink signaling indicates the UE to skip the first PDCCH monitoring, when new data has arrived at the UE, determine that the UE does not need to continue to change the first PDCCH monitoring; and when no new data has arrived at the UE yet, determine that the UE needs to continue to change the first PDCCH monitoring.

The present disclosure further provides in some embodiments a computer-readable storage medium storing therein a computer program. The computer program is executed by a processor, so as to transmit power-saving signaling carrying PDCCH monitoring indication information and/or monitoring indication information for the cells to a UE. The PDCCH monitoring indication information is used to indicate whether to change first PDCCH monitoring, the first PDCCH monitoring is periodic PDCCH monitoring within a search space configured for the UE, and the monitoring indication information for the cells is used to indicate a cell where the PDCCH monitoring needs to be performed.

The program is executed by the processor so as to implement the above-mentioned method for monitoring the PDCCH for the first network device with a same technical effect, which will thus not be particularly defined herein.

It should be appreciated that, units and steps described in the embodiments of the present disclosure may be implemented in the form of electronic hardware, or a combination of a computer program and the electronic hardware. Whether or not these functions are executed by hardware or software depends on specific applications or design constraints of the technical solution. Different methods may be adopted with respect to the specific applications so as to achieve the described functions, without departing from the scope of the present disclosure.

It should be further appreciated that, for convenience and clarification, operation procedures of the system, device and units described hereinabove may refer to the corresponding procedures in the method embodiment, and thus will not be particularly defined herein.

It should be further appreciated that, the device and method may be implemented in any other ways. For example, the embodiments for the apparatus is merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

The units may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

It should be further appreciated that, the above modules are divided merely on the basis of their logic functions, and in actual use, they may be completely or partially integrated into a physical entity, or physically separated from each other. These modules may be implemented by calling software through a processing element, or implemented in the form of hardware. For example, the determination module may be a processing element arranged separately, or integrated into a chip of the above-mentioned device. In addition, these modules may be stored in the memory of the above-mentioned device in the form of a program code, and may be called and executed by a processing element of the above-mentioned device so as to achieve the above functions. The other modules may be implemented in a similar manner. All or parts of the modules may be integrated together or arranged separately. Here, the modules, units or assemblies may each of an Integrated Circuit (IC) having a signal processing capability. During the implementation, the steps of the method or the modules may be implemented through an integrated logic circuit of the processing element in the form of hardware or through instructions in the form of software.

For example, the above modules may be one or more ICs capable of implementing the above-mentioned method, e.g., one or more Application Specific Integrated Circuits (ASICs), one or more Digital Signal Processors (DSPs), or one or more Field Programmable Gate Array (FPGA). For another example, when a certain module is implemented by calling a program code through a processing element, the processing element may be a general-purpose processor, e.g., a Central Processing Unit (CPU) or any other processor capable of calling the program code. These modules may be integrated together and implemented in the form of system-on-a-chip (SOC).

Such words as "first" and "second" involved in the specification and the appended claims are merely used to differentiate different objects rather than to represent any specific order. It should be appreciated that, the data used in this way may be replaced with each other, so as to implement the embodiments in an order other than that shown in the drawings or described in the specification. In addition, such terms as "include" or "including" or any other variations involved in the present disclosure intend to provide non-exclusive coverage, so that a procedure, method, system, product or device including a series of steps or units may also include any other elements not listed herein, or may include any inherent steps or units of the procedure, method, system, product or device. In addition, the expression "and/or" in the description and the appended claims is merely used to represent at least one of the objects before and after the expression. For example, "A and/or B and/or C" represents seven situations, i.e., there is only A, there is only B, there is only C, there are both A and B, there are both B and C, thereby are both A and C, and there are A, B and C. Similarly, the phrase "at least one of A and B" in the specification and the appended claims shall be understood as "there is only A, there is only B, or there are both A and B".

The above are only specific implementations of the present disclosure, but the protection scope of the present disclosure is not limited thereto. Any person skilled in the art can easily think of changes or substitutions within the technical scope disclosed in the present disclosure, and these changes or substitutions shall fall within the protection scope of the present disclosure. Therefore, the protection scope of the present disclosure should be subject to the protection scope of the claims.

What is claimed is:

1. A method for Physical Downlink Control Channel (PDCCH) monitoring, comprising:
transmitting a power-saving signaling that carries PDCCH monitoring indication information and monitoring indication information for cells to a User Equipment (UE), wherein the PDCCH monitoring indication information is used to indicate whether to change first PDCCH monitoring, the first PDCCH monitoring is the PDCCH monitored by the UE according to the configured search space, and the monitoring indication information for the cells is used to indicate a cell where the PDCCH monitoring needs to be performed,
wherein the PDCCH monitoring indication information comprises at least one of:
first indication information indicating whether to skip the first PDCCH monitoring;
second indication information indicating whether to skip the first PDCCH monitoring and indicating a next PDCCH monitoring occasion when the first PDCCH monitoring skipping has been indicated;

third indication information indicating whether to change a PDCCH monitoring periodicity and indicating to perform the PDCCH monitoring according to the changed PDCCH monitoring periodicity;

fourth indication information indicating whether to change the PDCCH monitoring periodicity and indicating the changed PDCCH monitoring periodicity or an index corresponding to the changed PDCCH monitoring periodicity;

wherein the monitoring indication information for the cells comprises at least one of:

fifth indication information indicating a first quantity of Secondary cells (Scells) where the monitoring is to be performed;

sixth indication information indicating information about the Scells where the monitoring is to be performed, wherein when the monitoring indication information for the cells is the fifth indication information, the method further comprises:

configuring an Scell list of the first quantity of Scells for the UE through high layer signaling; or configuring a correspondence between different quantities of Scells and Scell lists for the UE through high layer signaling; or selecting the first quantity of Scells from a plurality of Scells in accordance with a predetermined ranking algorithm.

2. The method according to claim 1, wherein when the PDCCH monitoring indication information is the first indication information, the method further comprises:

configuring a next PDCCH monitoring occasion for the UE through high layer signaling, wherein the next PDCCH monitoring occasion occurs when the first PDCCH monitoring skipping has been indicated.

3. The method according to claim 1, wherein when the PDCCH monitoring indication information is the third indication information, the method further comprises:

configuring the changed PDCCH monitoring periodicity for the UE through high layer signaling.

4. The method according to claim 1, wherein when the PDCCH monitoring indication information is the fourth indication information, the method further comprises:

configuring a correspondence between different values of the fourth indication information and the changed PDCCH monitoring periodicities for the UE through high layer signaling.

5. The method according to claim 1, wherein when the PDCCH monitoring indication information and the monitoring indication information for the cells in the power-saving signaling indicate that the first PDCCH monitoring is to be changed, the method further comprises:

determining a first target PDCCH monitoring occasion in accordance with the PDCCH monitoring indication information and the monitoring indication information for the cells carried in the power-saving signaling and high layer signaling, and transmitting downlink signaling and the power-saving signaling to the UE at the first target PDCCH monitoring occasion, wherein the downlink signaling carries the PDCCH monitoring indication information and the monitoring indication information for the cells.

6. The method according to claim 1, further comprising: transmitting first downlink signaling carrying the PDCCH monitoring indication information and the monitoring indication information for the cells to the UE.

7. The method according to claim 6, wherein when data is scheduled by the first downlink signaling, the PDCCH monitoring indication information and the monitoring indication information for the cells in the first downlink signaling are used to indicate that the first PDCCH monitoring is to be changed; or when the data is scheduled by the first downlink signaling, the PDCCH monitoring indication information and the monitoring indication information for the cells in the first downlink signaling are used to indicate that the first PDCCH monitoring is not to be changed.

8. The method according to claim 7, wherein after the first downlink signaling indicates the UE to change the first PDCCH monitoring, the method further comprises:

when data is scheduled by the second downlink signaling, determining whether the UE needs to continue monitoring PDCCH as the changed PDCCH monitoring or not; or when the second downlink signaling is not transmitted yet, determining that the UE needs to continue monitoring PDCCH as the changed PDCCH monitoring.

9. A method for Physical Downlink Control Channel (PDCCH) monitoring, comprising:

receiving a power-saving signaling that carries PDCCH monitoring indication information and monitoring indication information for cells and is transmitted by a network device, the PDCCH monitoring indication information being used to indicate whether to change first PDCCH monitoring, the first PDCCH monitoring being the PDCCH monitored by a UE according to the configured search space, and the monitoring indication information for the cells being used to indicate a cell where the PDCCH monitoring needs to be performed;

monitoring the PDCCH in accordance with the PDCCH monitoring indication information and the monitoring indication information for the cells in the power-saving signaling, wherein the PDCCH monitoring indication information comprises at least one of:

first indication information indicating whether to skip the first PDCCH monitoring;

second indication information indicating whether to skip the first PDCCH monitoring and indicating a next PDCCH monitoring occasion when the first PDCCH monitoring skipping has been indicated;

third indication information indicating whether to change a PDCCH monitoring periodicity and indicating to perform the PDCCH monitoring according to the changed PDCCH monitoring periodicity;

fourth indication information indicating whether to change the PDCCH monitoring periodicity and indicating the changed PDCCH monitoring periodicity or an index corresponding to the changed PDCCH monitoring periodicity;

wherein the monitoring indication information for the cells comprises at least one of:

fifth indication information indicating a first quantity of Scells where the monitoring is to be performed;

sixth indication information indicating information about the Scells where the monitoring is to be performed, wherein when the monitoring indication information for the cells is the fifth indication information, the Scell indicated by the fifth indication information is determined in accordance with any one of:
that the Scell indicated by the fifth indication information is determined in accordance with an Scell list of the first quantity of Scells configured through high layer signaling; or
that the Scell list of the first quantity of Scells is determined in accordance with a correspondence between different quantities of Scells and Scell lists configured through high layer signaling; or
that the first quantity of Scells are selected from a plurality of Scells in accordance with a predetermined ranking algorithm.

10. The method according to claim 9, wherein when the PDCCH monitoring indication information is the first indication information, the method further comprises:
receiving a next PDCCH monitoring occasion that is configured by the network device for the UE through high layer signaling and occurs when the first PDCCH monitoring skipping has been indicated;
when the first indication information indicates that the first PDCCH monitoring is to be skipped, determining, in accordance with a configuration of the high layer signaling, the next PDCCH monitoring occasion that occurs when the first PDCCH monitoring skipping has been indicated.

11. The method according to claim 9, wherein when the PDCCH monitoring indication information is the third indication information, the method further comprises:
receiving the changed PDCCH monitoring periodicity configured by the network device for the UE through high layer signaling;
determining, in accordance with the changed PDCCH monitoring periodicity configured through the high layer signaling, the next PDCCH monitoring occasion that occurs when the first PDCCH monitoring has been changed.

12. The method according to claim 9, wherein when the PDCCH monitoring indication information is the fourth indication information, the method further comprises:
receiving a correspondence between different values of the fourth indication information and the changed PDCCH monitoring periodicities configured by the network device for the UE through high layer signaling;
when the fourth indication information indicates that the PDCCH monitoring periodicity is to be changed, determining the changed PDCCH monitoring periodicity corresponding to the fourth indication information or an index corresponding to the changed PDCCH monitoring periodicity in accordance with the correspondence configured through the high layer signaling, and then determining the next PDCCH monitoring occasion when the first PDCCH monitoring has been changed.

13. A UE, comprising a memory, a processor, a transceiver, and a computer program stored in the memory and capable of being executed by the processor;
the transceiver is configured to receive a power-saving signaling that carries Physical Downlink Control Channel (PDCCH) monitoring indication information and monitoring indication information for the cells and is transmitted by a network device, the PDCCH monitoring indication information is used to indicate whether to change first PDCCH monitoring, the first PDCCH monitoring is the PDCCH monitored by a UE according to the configured search space, and the monitoring indication information for the cells is used to indicate a cell where the PDCCH monitoring needs to be performed;
the processor is configured to execute the computer program to monitor the PDCCH in accordance with the PDCCH monitoring indication information and the monitoring indication information for cells in the power-saving signaling,
wherein the PDCCH monitoring indication information comprises at least one of:
first indication information indicating whether to skip the first PDCCH monitoring;
second indication information indicating whether to skip the first PDCCH monitoring and indicating a next PDCCH monitoring occasion when the first PDCCH monitoring skipping has been indicated;
third indication information indicating whether to change a PDCCH monitoring periodicity and indicating to perform the PDCCH monitoring according to the changed PDCCH monitoring periodicity;
fourth indication information indicating whether to change the PDCCH monitoring periodicity and indicating the changed PDCCH monitoring periodicity or an index corresponding to the changed PDCCH monitoring periodicity;
wherein the monitoring indication information for the cells comprises at least one of:
fifth indication information indicating a first quantity of Scells where the monitoring is to be performed;
sixth indication information indicating information about the Scells where the monitoring is to be performed,
wherein when the monitoring indication information for the cells is the fifth indication information, the Scell indicated by the fifth indication information is determined in accordance with any one of:
that the Scell indicated by the fifth indication information is determined in accordance with an Scell list of the first quantity of Scells configured through high layer signaling; or
that the Scell list of the first quantity of Scells is determined in accordance with a correspondence between different quantities of Scells and Scell lists configured through high layer signaling; or
that the first quantity of Scells are selected from a plurality of Scells in accordance with a predetermined ranking algorithm.

14. A network device, comprising a memory, a processor, a transceiver, and a computer program stored in the memory and capable of being executed by the processor, wherein the processor is configured to execute the computer program to implement the method according to claim 1.

* * * * *